(12) United States Patent
Tsurumi

(10) Patent No.: US 9,932,891 B2
(45) Date of Patent: Apr. 3, 2018

(54) ENGINE SYSTEM

(71) Applicant: YUTAKASHOJI CO., LTD., Toyota-shi, Aichi (JP)

(72) Inventor: Kazunori Tsurumi, Toyota (JP)

(73) Assignee: YUTAKASHOJI CO., LTD., Aichi (JP)

( * ) Notice: Subject to any disclaimer, the term of this patent is extended or adjusted under 35 U.S.C. 154(b) by 99 days.

(21) Appl. No.: 14/897,287

(22) PCT Filed: Jun. 25, 2014

(86) PCT No.: PCT/JP2014/066798
§ 371 (c)(1),
(2) Date: Dec. 10, 2015

(87) PCT Pub. No.: WO2014/208580
PCT Pub. Date: Dec. 31, 2014

(65) Prior Publication Data
US 2016/0131024 A1    May 12, 2016

(30) Foreign Application Priority Data
Jun. 28, 2013   (JP) .................... 2013-137073

(51) Int. Cl.
*F02B 51/00*      (2006.01)
*F02B 43/10*      (2006.01)
(Continued)

(52) U.S. Cl.
CPC .......... *F02B 43/10* (2013.01); *C01B 13/0207* (2013.01); *C25B 1/04* (2013.01);
(Continued)

(58) Field of Classification Search
CPC ........... Y02E 60/366; C25B 1/04; C25B 9/06; C25B 9/00; C25B 1/02; C25B 11/00;
(Continued)

(56) References Cited

U.S. PATENT DOCUMENTS 3,055,821 A * 9/1962 Holmes .................... C25B 9/00
204/270
3,310,483 A * 3/1967 Rhodes .................. C25B 9/066
204/268
(Continued)

FOREIGN PATENT DOCUMENTS

JP         05256160 A  * 10/1993
JP         6-169783       6/1994
(Continued)

*Primary Examiner* — Marguerite McMahon
*Assistant Examiner* — Tea Holbrook
(74) *Attorney, Agent, or Firm* — Clark & Brody

(57) ABSTRACT

An engine system 10A is characterized by having a first electrolyzing device 11A for electrolyzing water into hydrogen and oxygen, an engine 12 which runs on the combustion of a mixed gas of the hydrogen and oxygen generated by the first electrolyzing device 11A, a battery 14 for storing electricity, a boosting coil 16 for boosting the voltage of electricity stored in the battery and supplying the boosted high-voltage electricity to the first electrolyzing device 11A and ignition plugs of the engine 12, and an alternator 15 for generating electricity from the running of the engine and supplying the generated electricity to the battery 14. The engine system can be driven by simply replenishing water without requiring construction of refilling stands or replacement of tanks.

20 Claims, 20 Drawing Sheets

(51) Int. Cl.
  *F02B 47/02* (2006.01)
  *F02M 21/02* (2006.01)
  *F02M 25/028* (2006.01)
  *C01B 13/02* (2006.01)
  *C25B 15/08* (2006.01)
  *C25B 1/04* (2006.01)
  *C25B 9/20* (2006.01)

(52) U.S. Cl.
  CPC .............. *C25B 9/20* (2013.01); *C25B 15/08* (2013.01); *F02B 47/02* (2013.01); *F02M 21/0206* (2013.01); *F02M 21/0227* (2013.01); *F02M 25/028* (2013.01); *F02B 2043/106* (2013.01); *Y02E 60/366* (2013.01); *Y02T 10/121* (2013.01); *Y02T 10/32* (2013.01)

(58) Field of Classification Search
  CPC ........... C25B 9/02; C25B 11/02; C25B 15/08; C25B 9/20; Y02T 10/32; Y02T 10/121; F02B 2043/106; F02B 43/10; F02B 47/02; F02D 19/0671; F02D 41/0027; C10L 2200/0295; C01B 13/0207; F02M 21/0206; F02M 21/0227; F02M 25/028
  See application file for complete search history.

(56) References Cited

U.S. PATENT DOCUMENTS

| | | | | |
|---|---|---|---|---|
| 3,608,529 A * | 9/1971 | Smith | ............... | F02B 47/00 123/1 A |
| 3,759,815 A * | 9/1973 | Larsson | ............... | C25B 9/066 204/254 |
| 4,124,480 A * | 11/1978 | Stevenson | ............... | C25B 9/00 204/255 |
| 4,194,953 A * | 3/1980 | Hatherly | ............... | C25B 1/265 204/269 |
| 4,206,029 A * | 6/1980 | Spirig | ............... | C25B 1/06 204/228.1 |
| 4,369,102 A * | 1/1983 | Galluzzo | ............... | C25B 9/04 204/228.1 |
| 4,392,937 A * | 7/1983 | Schmitt | ............... | C25B 9/066 204/269 |
| 4,457,816 A * | 7/1984 | Galluzzo | ............... | C25B 9/04 204/270 |
| 4,761,216 A * | 8/1988 | Cawlfield | ............... | C25B 1/14 204/284 |
| 5,272,871 A * | 12/1993 | Oshima | ............... | B01F 5/0451 60/274 |
| 5,705,051 A * | 1/1998 | Coin | ............... | B01D 53/1425 205/770 |
| 5,711,865 A * | 1/1998 | Caesar | ............... | C25B 1/04 204/228.2 |
| 6,630,061 B2 * | 10/2003 | Lee | ............... | C25B 1/04 204/239 |
| 6,698,183 B1 * | 3/2004 | Thordarson | ............ | B63H 11/02 60/39.465 |
| 6,866,756 B2 * | 3/2005 | Klein | ............... | C25B 9/06 123/3 |
| 8,163,142 B1 * | 4/2012 | Stama | ............... | C25B 1/04 123/3 |
| 8,449,737 B2 * | 5/2013 | Richardson | ............... | C25B 1/04 204/268 |
| 8,852,410 B1 * | 10/2014 | Turgeon | .................. | C25B 15/02 204/267 |
| 2004/0074781 A1 * | 4/2004 | Klein | ............... | C25B 9/06 205/628 |
| 2007/0034426 A1 * | 2/2007 | Akamatsu | ............... | B82Y 10/00 123/3 |
| 2007/0234900 A1 * | 10/2007 | Soloveichik | ............... | C25B 9/10 95/46 |
| 2008/0202942 A1 * | 8/2008 | Wilkinson | ................ | C25B 1/04 205/742 |
| 2009/0090312 A1 * | 4/2009 | Stehl | ........ | C10L 3/00 123/3 |
| 2010/0038236 A1 * | 2/2010 | Rivera | ...... | C25B 1/04 204/270 |
| 2010/0065419 A1 * | 3/2010 | Richardson | ............... | C25B 1/04 204/228.2 |
| 2010/0140102 A1 * | 6/2010 | Aujollet | .................... | C25B 1/04 205/628 |
| 2010/0258450 A1 * | 10/2010 | Burtch | ........ | C25B 1/02 205/639 |
| 2010/0275858 A1 * | 11/2010 | Jeffs | .............. | F02B 43/10 123/3 |
| 2010/0275859 A1 * | 11/2010 | Klotz | ........ | C25B 1/06 123/3 |
| 2011/0006544 A1 * | 1/2011 | Geurts | .................... | B63J 99/00 290/1 A |
| 2011/0017607 A1 * | 1/2011 | Moon | ...... | C25B 1/04 205/628 |
| 2011/0057455 A1 * | 3/2011 | Russo | ..... | C25B 1/04 290/1 A |
| 2012/0067021 A1 * | 3/2012 | Aggelopoulos | ........... | C25B 1/08 60/39.12 |
| 2012/0305407 A1 * | 12/2012 | Anderson | ............... | C25B 1/02 205/619 |
| 2013/0175160 A1 * | 7/2013 | Shibata | ............... | C02F 1/46104 204/196.37 |
| 2014/0251794 A1 * | 9/2014 | Kirkpatrick | ............... | C25B 1/04 204/240 |

FOREIGN PATENT DOCUMENTS

| | | | |
|---|---|---|---|
| JP | 11-257206 | | 9/1999 |
| JP | 11-302885 | | 11/1999 |
| JP | 2001-012310 | | 1/2001 |
| JP | 2004-130263 | | 4/2004 |
| JP | 2008063980 A | * | 3/2008 |
| JP | 2008-309084 | | 12/2008 |
| JP | 2009-281199 | | 12/2009 |
| JP | 2011-092884 | | 5/2011 |

\* cited by examiner

ENGINE SYSTEM

TECHNICAL FIELD

The present invention relates to an engine system that uses a mixed gas of hydrogen and oxygen.

BACKGROUND ART

There has been disclosed a hydrogen engine system mounted in a vehicle, including a plurality of intake pipe sections forming intake passages communicating with a plurality of combustion chambers, an intake pipe collecting section connected with these intake pipe sections to form a collecting space which is a space where these intake passages are collected, a plurality of first injection valves that inject one of hydrogen and oxygen to either the plurality of combustion chambers or the plurality of intake passages, an intake connection passage constituting section having one end connected with the intake pipe collecting section to form one intake connection passage communicating with the collection space, and a second injection valve that injects the other of hydrogen and oxygen to a predetermined region of the intake connection passage (see Patent Literature 1).

CITATION LIST

Patent Literature

Patent Literature 1
Japanese Unexamined Patent Application Publication No. 2009-281199

SUMMARY OF INVENTION

Technical Problem

In the hydrogen engine system disclosed in Patent Literature 1, hydrogen as fuel is accommodated in a hydrogen tank, oxygen is accommodated in an oxygen tank, and the hydrogen or the oxygen is supplied to the injection valve from these tanks. In this hydrogen engine system, when the hydrogen and the oxygen are consumed by combustion in the combustion chamber, each tank must be refilled with the hydrogen or the oxygen, refilling stands to refill with the hydrogen or the oxygen must be established across the country, infrastructures to operate the system must be built, thoroughgoing safety measures for storage of the hydrogen or the oxygen in the refilling stands must be formulated, and hence enormous costs and time are required. Further, if such refilling stands do not exist, refilling with the hydrogen or the oxygen is impossible, tanks filled up with the hydrogen or the oxygen must be carried to a replacement site in case of fuel shortage, an empty tank must be removed, a filled tank must be disposed, and hence unnecessary labor and time for the replacement are required.

It is an object of the present invention to provide an engine system that can drive by just replenishing water without requiring construction of refilling stands or replacement of tanks.

Means for Solving Problem

To solve the problem, the present invention is characterized by including: at least one first electrolyzing device that decomposes water into hydrogen and oxygen by electrolysis; an engine that drives by combustion of a mixed gas of the hydrogen and the oxygen generated in the first electrolyzing device; a battery that stores electricity; a boosting coil that energizes the first electrolyzing device and an ignition plug of the engine with boosted high-voltage electricity while boosting a voltage of the electricity stored in the battery; and an alternator that energizes the battery with generated electricity while generating electricity by driving of the engine.

As an example of the present invention, the first electrolyzing device includes: a first housing with a predetermined capacity that accommodates the water; a first positive electrode that is accommodated in the first housing and energized with positive high-voltage electricity from the boosting coil; a first negative electrode that is accommodated in the first housing and energized with negative high-voltage electricity from the boosting coil; and a first supply mechanism that supplies the mixed gas generated in the first housing to the engine.

As another example of the present invention, the first housing is a hexahedron having top and bottom walls, front and rear walls, and both sidewalls, the first positive electrode is formed of a positive energization plate with a predetermined area that is fixed to the front wall of the first housing in an insulating manner and a plurality of positive electrode plates each having a predetermined area that are connected to the positive energization plate and extend from the positive energization plate toward the rear wall of the first housing, the first negative electrode is formed of a negative energization plate with a predetermined area that is fixed to the rear wall of the first housing in an insulating manner and a plurality of negative electrode plates each having a predetermined area that are connected to the negative energization plate and extend toward the front wall of the first housing from the negative energization plate, and the positive electrode plates and the negative electrode plates are alternately arranged to become parallel to each other in the first housing so that each negative electrode plate is placed between the positive electrode plates adjacent to each other and each positive electrode plate is placed between the negative electrode plates adjacent to each other.

As still another example of the present invention, in the first electrolyzing device, the positive electrode plates extend from the front wall toward the rear wall of the first housing while repeating ups and downs, and the negative electrode plates extend from the rear wall toward the front wall of the first housing while repeating ups and downs.

As yet another example of the present invention, in the first electrolyzing device, an insulator spacer, which holds a parallel state of each positive electrode plate and each negative electrode plate and also holds a clearance dimension between these electrodes, is arranged between each positive electrode plate and each negative electrode plate adjacent to each other.

As a further example of the present invention, in the first electrolyzing device, the insulator spacer is arranged between each positive electrode and each negative electrode plate extending on the front wall side of the first housing, and the insulator spacer is arranged between each positive electrode plate and each negative electrode plate extending on the rear wall side of the first housing.

As a still further example of the present invention, in the first electrolyzing device, the clearance dimension between the positive electrode plate and the negative electrode plate adjacent to each other is in the range of 5 to 12 mm.

As a yet further example of the present invention, in the first electrolyzing device, an area of each of facing surfaces of the positive electrode plates and the negative electrode plates is in the range of 1000 to 2100 cm$^2$, and a thickness dimension of each of the positive electrode plates and the negative electrode plates in the range of 1 to 2 mm.

As another example of the present invention, in the first electrolyzing device, each of the number of the positive electrode plates connected to the positive energization plate and the number of the negative electrode plates connected to the negative energization plate is in the range of 10 to 25, and the number of the positive electrode plates is equal to the number of the negative electrode plates.

As still another example of the present invention, in the engine system, exhaust oxygen generated after combusting the mixed gas in a combustion chamber of the engine is supplied into the first housing from the lower side of the first housing, and many fine air bubbles are generated in the water accommodated in the first housing by using the exhaust oxygen.

As yet another example of the present invention, in the engine system, mist-like water is injected simultaneously with supplying the mixed gas into the combustion chamber of the engine, and the mist-like water is subjected to vapor explosion by using combustion of the mixed gas in the combustion chamber.

As a further example of the present invention, the engine system includes at least one second electrolyzing device that stores water which is fed to the first electrolyzing device, decomposes the water into hydrogen and oxygen by the electrolysis, and supplies a mixed gas of the generated hydrogen and oxygen and the water to the first electrolyzing device, and the boosting coil energizes the second electrolyzing device with the boosted high-voltage electricity.

As a still further example of the present invention, the second electrolyzing device includes: a second housing with a predetermined capacity that stores the water, a second positive electrode that is accommodated in the second housing and energized with positive high-voltage electricity from the boosting coil, a second negative electrode that is accommodated in the second housing and energized with negative high-voltage electricity from the boosting coil, and a second supply mechanism that supplies the mixed gas generated in the second housing and the water to the first electrolyzing device.

As a yet further example of the present invention, the second housing is a hexahedron having top and bottom walls, front and rear walls, and both sidewalls, the second positive electrode is formed of a positive energization plate with a predetermined area fixed to the front wall of the second housing in an insulating manner and a plurality of positive electrode plates each having a predetermined area that are connected to the positive energization plate and extend from the positive energization plate toward the rear wall of the second housing, the second negative electrode is formed of a negative energization plate with a predetermined area fixed to the rear wall of the second housing in an insulating manner and a plurality of negative electrode plates each having a predetermined area that are connected to the negative energization plate and extend from the negative energization plate toward the front wall of the second housing, and the positive electrode plates and the negative electrode plates are alternately aligned in a state where the positive electrodes and the negative electrode plates are parallel to each other so that the negative electrode plate is placed between the positive electrode plates adjacent to each other and the positive electrode plate is placed between the negative electrode plates adjacent to each other in the second housing.

As another example of the present invention, in second electrolyzing device, the positive electrode plates extend from the front wall toward the rear wall of the second housing while repeating ups and downs and the negative electrode plates extend from the rear wall toward the front wall of the second housing while repeating ups and downs.

As still another example of the present invention, in the second electrolyzing device, an insulator pacer, which holds a parallel state of the positive electrode plates and the negative electrode plates and also holds a clearance dimension between these plates constant, is placed between the positive electrode plates and the negative electrode plates adjacent to each other.

As yet another example of the present invention, in the second electrolyzing device, the insulator spacer is arranged between the positive electrode plates and the negative electrode plates extending on the front wall side of the second housing, and the insulator spacer is arranged between the positive electrode, plates and the negative electrode plates extending on the rear wall side of the second housing.

As a further example of the present invention, in the second electrolyzing device, the clearance dimension between the positive electrode plate and the negative electrode plate adjacent to each other is in the range of 5 to 12 mm.

As a still further example of the present invention, in the second electrolyzing device, an area of each of facing surfaces of the positive electrode plates and the negative electrode plates is in the range of 1500 to 2550 cm$^2$, and a thickness dimension of each of the positive electrode plates and the negative electrode plates is in the range of 1 to 2 mm.

As a yet further example of the present invention, in the second electrolyzing device, each of the number of the positive electrode plates connected to the positive energization plate and the number of negative electrode plates connected to the negative energization plate is in the range of 15 to 30, and the number of the positive electrode plates is equal to the number of the negative electrode plates.

As another example of the present invention, in the engines system, exhaust oxygen generated after combusting the mixed gas in the combustion chamber of the engine is supplied into the second housing from the lower side of the second housing, and many fine air bubbles are generated in the water accommodated in the second housing by using the exhaust oxygen.

As still another example of the present invention, the engine system is mounted in a vehicle.

Effect of the Invention

According to the engine system of the present invention, since the mixed gas of the hydrogen and the oxygen is generated by electrolyzing water to be decomposed into the hydrogen and the oxygen in the first electrolyzing device, the hydrogen or the oxygen does not have to be additionally supplied from a tank, the tank accommodating the hydrogen or the oxygen does not have to be installed, and just supplying water to the first electrolyzing device enables driving the engine. Further, since the alternator which energizes the battery with electricity generated by the driving of the engine is provided, just supplying water enables generating the electricity, and the battery can be energized with the generated electricity. Since the engine system combusts the mixed gas of the hydrogen and the oxygen in the engine, the oxygen and the water alone are discharged after combustion, an exhaust gas containing $CO^2$, NOX, or MOX is not discharged, and environmental destruction or global warming can be avoided. According to the engine system, refilling stands to refill with the hydrogen or the oxygen do not have to be constructed, infrastructures to operate the system do not have to be developed, safety measures in the refilling stands do not have to be taken, costs or time to develop the infrastructures can be reduced, and costs or time required for the safety measures can be reduced. According to the engine system, although the water is consumed by consumption of the hydrogen and the oxygen, the engine can be driven by just refilling with water corresponding to the consumption, thus saving unnecessary labor and time.

According to the engine system in which the first electrolyzing device has the first housing accommodating the water, the first positive electrode energized with positive high-voltage electricity from the boosting coil, the first negative electrode energized with negative high-voltage electricity from the boosting coil, and the first supply mechanism that supplies the mixed gas to the engine, since the first positive electrode and the first negative electrode are energized with the high-voltage electricity from the boosting coil to electrolyze the water and the hydrogen and the oxygen are generated from these electrodes, the mixed gas of the hydrogen and the oxygen can be assuredly generated from the water, and combusting the generated mixed gas in the engine enables driving the engine with predetermined torque. In the engine system, the hydrogen or the oxygen does not have to be supplied to the engine from a tank, the tank accommodating the hydrogen or the oxygen does not have to be installed, the engine can be hence driven by just supplying the water to the first electrolyzing device, and electricity can be generated by simply supplying the water, thus energizing the battery with the generated electricity.

In the engine system in which the first positive electrode is formed of the positive energization plate having a predetermined area that is fixed on the front wall of the first housing and the plurality of positive electrode plates each having a predetermined area that extend toward the rear wall of the first housing from the positive energization plate, the first negative electrode is formed of the negative energization plate having a predetermined area that is fixed on the rear wall of the first housing and the plurality of negative electrode plates each having a predetermined area that extend toward the front wall of the first housing from the negative energization plate, and the positive electrode plate and the negative electrode plate are alternately aligned in parallel, since the water is electrolyzed by energizing the positive electrode plates and the negative electrode plates with the high-voltage electricity from the boosting coil and the hydrogen and the oxygen are generated from these plates, the mixed gas of the hydrogen and the oxygen can be assuredly generated from the water, and combusting the generated mixed gas in the engine enables driving the engine with predetermined torque. According to the engine system, the hydrogen or the oxygen does not have to be supplied from the tank, the tank accommodating the hydrogen or the oxygen does not have to be installed, simply supplying the water to the first electrolyzing device enables driving the engine, simply supplying the water enables generating the electricity, and the battery can be energized with the generated electricity.

According to the engine system in which the positive electrode plates extend from the front wall toward the rear wall of the first housing while repeating ups and downs and the negative electrode plates extend from the rear wall toward the front wall of the first housing while repeating ups and downs in the first electrolyzing device, since the positive electrode plates or the negative electrode plates repeat the ups and downs, as compared with a case where these plates linearly extend, surface areas of these plates can be increased, and a large amount of the hydrogen or the oxygen can be generated per unit time by using these plates. In the engine system, a large amount of mixed gas of the generated hydrogen and oxygen can be combusted in the engine, and the engine can be driven with large torque.

According to the engine system in which the insulator spacer which holds a parallel state between each positive electrode plate and each negative electrode plate and also holds the clearance dimension between these electrode plates constant is arranged between these plates adjacent to each other in the first electrolyzing device, since the parallel state between these plates can be held and the clearance dimension between these plates can be held constant by using the insulator spacer, these plates can be prevented from getting closer to or coming in to contact with each other beyond necessity, these plates are not short-circuited, and the mixed gas of the hydrogen and the oxygen can be assuredly generated from water by using the positive electrode plates or the negative electrode plates.

According to the engine system in which the insulator spacer is arranged between the plates extending on the front wall side of the first housing and the insulator spacer is arranged between the plates extending on the rear wall side of the first housing in the first electrolyzing device, the insulator spacers do not obstruct electrolysis of the positive electrode plates or the negative electrode plates, the mixed gas of the hydrogen and the oxygen can be assuredly generated from water by using these plates, and combusting the generated mixed gas in the engine enables driving the engine with predetermined torque. In the engine system, since the parallel state of these plates can be held and the clearance dimension between these plates can be maintained constant by using the insulator spacers, the plates can be prevented from getting closer to or coming into contact with each other beyond necessity, and careless short-circuiting of these plates can be avoided.

According to the engine system in which the clearance dimension between the positive electrode plate and the negative electrode plate adjacent to each other is in the range of 5 to 12 mm in the first electrolyzing device, setting the clearance dimension between these plates to this range enables preventing these plates from coming into contact with each other and also enables closely installing these plates in the first housing. In the engine system, the mixed gas of the hydrogen and the oxygen can be assuredly generated from water by using these plates, and the generated mixed gas is combusted in the engine, thus driving the engine with the predetermined torque.

According to the engine system in which an area of each of facing surfaces of the positive electrode plates and the negative electrode plates is in the range of 1000 to 21A00 $cm^2$ and a thickness dimension of each of the positive electrode plates and the negative electrode plates is in the range of 1 to 2 mm in the first electrolyzing device, since the area of each of the facing surfaces of these plates is in this range, a large amount of hydrogen or oxygen can be generated per unit time in the first electrolyzing device by using these plates each having the large area, and combusting a large amount of mixed gas of the generate hydrogen and oxygen in the engine enables driving the engine with large torque.

According to the engine system in which each of the number of the positive electrode plates and the number of the negative electrode electrodes is in the range of 10 to 25 and the number of the positive electrode plates is equal to the number of the negative electrode plates in the first electrolyzing device, since the number of the positive electrode plates forming the first positive electrode or the number of the negative electrode plates forming the first negative electrode is in the above-described range, these plates can be closely installed in the first housing, a large amount of the hydrogen or the oxygen can be generated by using these plates, and a large amount of mixed gas of the hydrogen and the oxygen can be generated from water. In the engine system, the mixed gas of the hydrogen and the oxygen can be assuredly generated from water by using these plates, and combusting the generated mixed gas in the engine enables driving the engine with the predetermined torque.

According to the engine system in which the exhaust oxygen generated after combusting the mixed gas in the combustion chamber of the engine is supplied into the first housing from the lower side of the first housing and many fine air bubbles are generated in water stored in the first housing by using the exhaust oxygen, when the fine air bubbles are generated in water by using the exhaust oxygen, the water stored in the first housing is stirred, the hydrogen or the oxygen generated by the electrolysis is also stirred, the mixed gas in which the hydrogen and the oxygen are mixed can be created in the first housing, and the engine can be driven with the predetermined torque by supplying this mixed gas to the engine and combusting the mixed gas in the engine.

According to the engine system in which mist-like water is injected simultaneously with supply of the mixed gas into the combustion chamber of the engine and the mist-like water is subjected to vapor explosion by using the combustion of the mixed gas in the combustion chamber, explosion force in the combustion chamber can be increased by subjecting the mist-like water to the vapor explosion, and the torque of the engine to be driven can be raised.

According to the engine system that includes the second electrolyzing device which stores water to be fed to the first electrolyzing device, decomposes the water into hydrogen and oxygen by the electrolysis, and supplies a mixed gas of the generated hydrogen and oxygen and the water to the first electrolyzing device and that has the boosting coil energizing the second electrolyzing device with high-voltage electricity, since the generated mixed gas is supplied to the first electrolyzing device while generating the mixed gas of the hydrogen and the oxygen from the water in the second electrolyzing device, water corresponding to an amount consumed in the first electrolyzing device can be replenished through the second electrolyzing device, the first electrolyzing device can be filled up with the mixed gas from the second electrolyzing device, and a large amount of the mixed gas can be supplied to the engine from the first electrolyzing device. In the engine system, a large amount of the mixed gas is supplied to the engine, and a large amount of the mixed gas is combusted in the engine, thereby driving the engine with large torque.

According to the engine system in which the second electrolyzing device includes the second housing storing water, the second positive electrode energized with positive high-voltage electricity from the boosting coil, the second negative electrode energized with negative high-voltage electricity from the boosting coil, and the second supply mechanism that supplies the mixed gas and the water to the first electrolyzing device, since the water is electrolyzed by energizing the first positive electrode and the first negative electrode with the high-voltage electricity from the boosting coil and the hydrogen and the oxygen are generated from these electrodes, the mixed gas of the hydrogen and the oxygen can be assuredly generated from the water, and the generated mixed gas can be assuredly supplied to the first electrolyzing device. In the engine system, since the first electrolyzing device can be refilled with the mixed gas from the second electrolyzing device, a large amount of the mixed gas can be supplied to the engine from the first electrolyzing device, and combusting a large amount of the mixed gas in the engine enables driving the engine with the large torque. In the engine system, since the water is supplied to the first electrolyzing device from the second electrolyzing device besides the mixed gas of the hydrogen and the oxygen, the water corresponding to an amount consumed by the electrolysis in the first electrolyzing device can be replenished, the electrolysis can be carried out in the first electrolyzing device for a long time, and an appreciable amount of hydrogen or oxygen can be generated.

According to the engine system in which the second positive electrode is formed of the positive energization plate with a predetermined area fixed on the front wall of the second housing and the plurality of positive electrode plates each of which has a predetermined area extending from the positive energization plate to the rear wall of the second housing, the second negative electrode is formed of the negative energization plate with a predetermined area fixed on the rear wall of the second housing and the plurality of negative electrode plates each of which has a predetermined area extending from the negative energization plate to the front wall of the second housing, and the positive electrode plates and the negative electrode plates are alternately aligned in a parallel state, since the water is electrolyzed by energizing these positive electrode plates or these negative electrode plates with high-voltage electricity from the boosting coil and the hydrogen and the oxygen are generated from these plates, the mixed gas of the hydrogen and the oxygen can be assuredly generated from the water, and the generated mixed gas can be assuredly supplied to the first electrolyzing device. In the engine system, since the first electrolyzing device can be replenished with the mixed gas from the second electrolyzing device, a large amount of the mixed gas can be supplied to the engine from the first electrolyzing device, and combusting a large amount of the mixed gas in the engine enables driving the engine with large torque.

According to the engine system in which the positive electrode plates extend from the front wall toward the rear wall of the second housing while repeating ups and downs and the negative electrode plates extend from the rear wall toward the front wall of the second housing while repeating ups and down in the second electrolyzing device, since the positive electrode plates or the negative electrode plates repeat the ups and downs, as compared with a case where these plates linearly extend, surface areas of these plates can be increased, and a large amount of the hydrogen or the oxygen can be generated per unit time by using these plates. In the engine system, since a large amount of the mixed gas of the hydrogen and the oxygen generated in the second electrolyzing device can be supplied to the first electrolyzing device, a large amount of the mixed can be supplied to the engine from the first electrolyzing device, and combusting a large amount of the mixed gas in the engine enables driving the engine with large torque.

According to the engine system in which the insulator spacer which holds a parallel state between each positive electrode plate and each negative electrode plate and also holds the clearance dimension between these electrode plates constant is arranged between these plates adjacent to each other in the second electrolyzing device, since the parallel state between these plates can be held and the clearance dimension between these plates can be held constant by using the insulator spacer, these plates can be prevented from getting closer to or coming in to contact with each other beyond necessity, these plates are not short-circuited, the mixed gas of the hydrogen and the oxygen can be assuredly generated from water by using the positive electrode plates or the negative electrode plates, and the generated mixed gas can be assuredly supplied from the second electrolyzing device to the first electrolyzing device.

According to the engine system in which the insulator spacer is arranged between these plates extending on the front wall side of the second housing and the insulator spacer is arranged between these plates extending on the rear wall of the second housing in the second electrolyzing device, the insulator spacers do not obstruct the electrolysis of the positive electrode plates or the negative electrode plates, the mixed gas of the hydrogen and the oxygen can be assuredly generated from the water by using these plates, and the generated mixed gas can be assuredly supplied to the first electrolyzing device from the second electrolyzing device. According to the engine system, since using the insulator spacers enables holding the parallel state of these plates and also enables holding the clearance dimension between these plates constant, these plates can be prevented from getting closer to each other or coming into contact with each other beyond necessity, and the careless short-circuiting of these plates can be avoided.

According to the engine system in which the clearance dimension between the positive electrode plate and the negative electrode plate adjacent to each other is in the range of 5 to 12 mm in the second electrolyzing device, setting the clearance dimension between these plates to this range enables preventing these plates from coming into contact with each other and also enables closely installing these plates in the second housing. In the engine system, the mixed gas of the hydrogen and the oxygen can be assuredly generated from water by using these plates, and the generated mixed gas can be assuredly supplied to the first electrolyzing device from the second electrolyzing device.

According to the engine system in which an area of each of facing surfaces of the positive electrode plates and the negative electrode plates is in the range of 1500 to 2550 $cm^2$ and a thickness dimension of each of the positive electrode plates and the negative electrode plates is in the range of 1 to 2 mm in the second electrolyzing device, since the area of each of the surfaces of these plates facing each other is in this range, a large amount of hydrogen or oxygen can be generated per unit time in the second electrolyzing device by using these plates each having the large area, and a large amount of the mixed gas of the hydrogen and the oxygen can be supplied to the first electrolyzing device from the second electrolyzing device.

According to the engine system in which each of the number of the positive electrode plates and the number of the negative electrode electrodes is in the range of 15 to 30 and the number of the positive electrode plates is equal to the number of the negative electrode plates in the second electrolyzing device, since the number of the positive electrode plates forming the second positive electrode or the number of the negative electrode plates forming the second negative electrode is in the above-described range, these plates can be closely installed in the second housing, and a large amount of the hydrogen or the oxygen can be generated by using these plates. In the engine system, the mixed gas of the hydrogen and the oxygen can be assuredly generated from water by using these plates, and a large amount of the generated mixed gas can be supplied to the first electrolyzing device from the second electrolyzing device.

According to the engine system in which the exhaust oxygen generated after combusting the mixed gas in the combustion chamber of the engine is supplied into the second housing from the lower side of the second housing and many fine air bubbles are generated in water stored in the second housing by using the exhaust oxygen, when the fine air bubbles are generated in water by using the exhaust oxygen, the water stored in the second housing is stirred, the hydrogen or the oxygen generated by the electrolysis is also stirred, the mixed gas in which the hydrogen and the oxygen are mixed can be created in the second housing, and the mixed gas can be supplied to the first electrolyzing device from the second electrolyzing device.

When the engine system is mounted in a vehicle, the engine is driven with the use of the mixed gas of the hydrogen and the oxygen, not only the vehicle is enabled to travel, but also the oxygen and water alone are discharged from this vehicle during traveling, and it is possible to manufacture vehicles that can avoid environmental destruction or global warming without discharging exhaust gas containing $CO^2$, NOX, or MOX.

BEST MODE(S) FOR CARRYING OUT THE INVENTION

Figure 2:
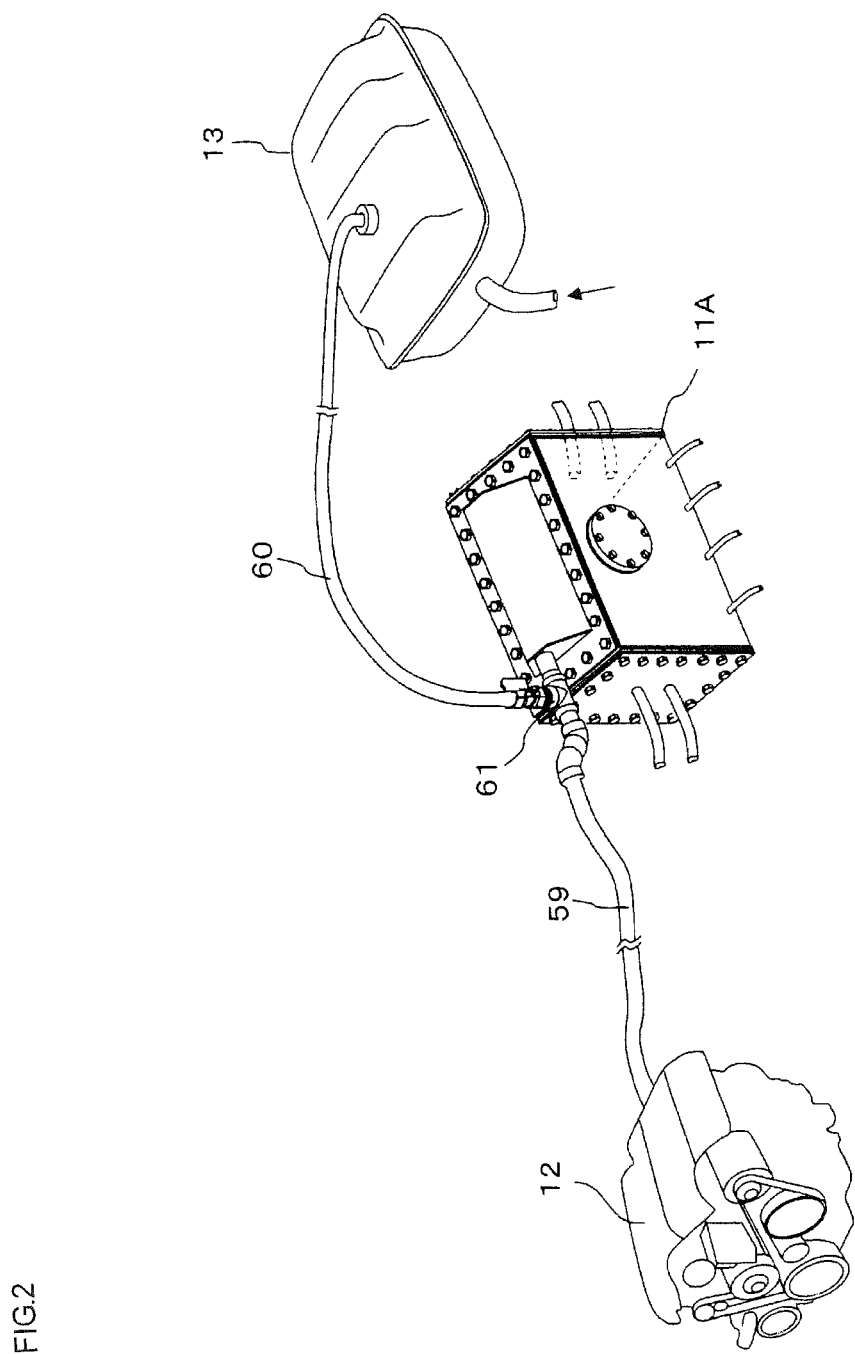
FIG. 2 is a perspective view showing a coupled state of a first electrolyzing device, an engine, and a fuel tank.
Figure 3:
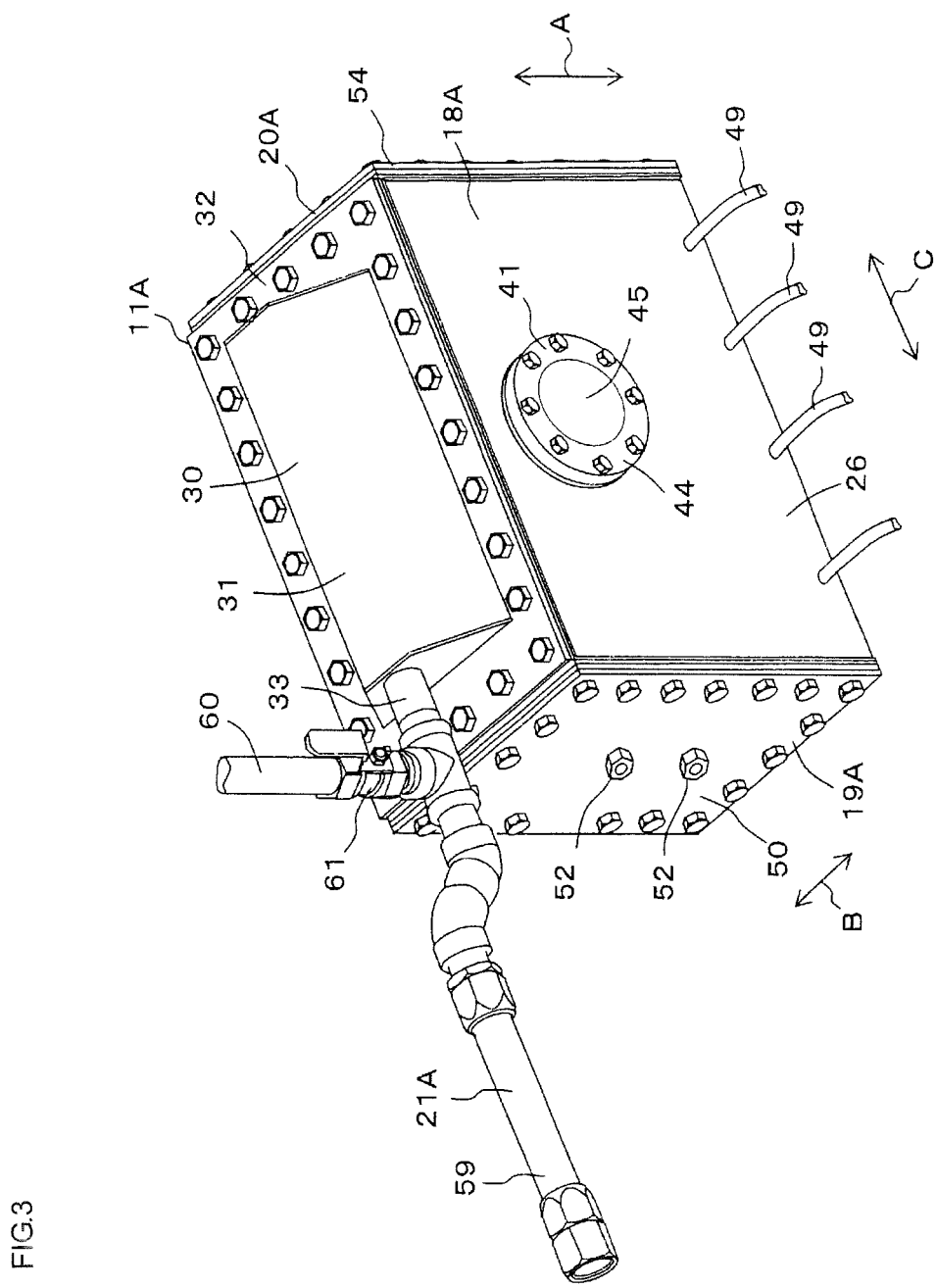
FIG. 3 is a perspective view of the first electrolyzing device.
Figure 4:
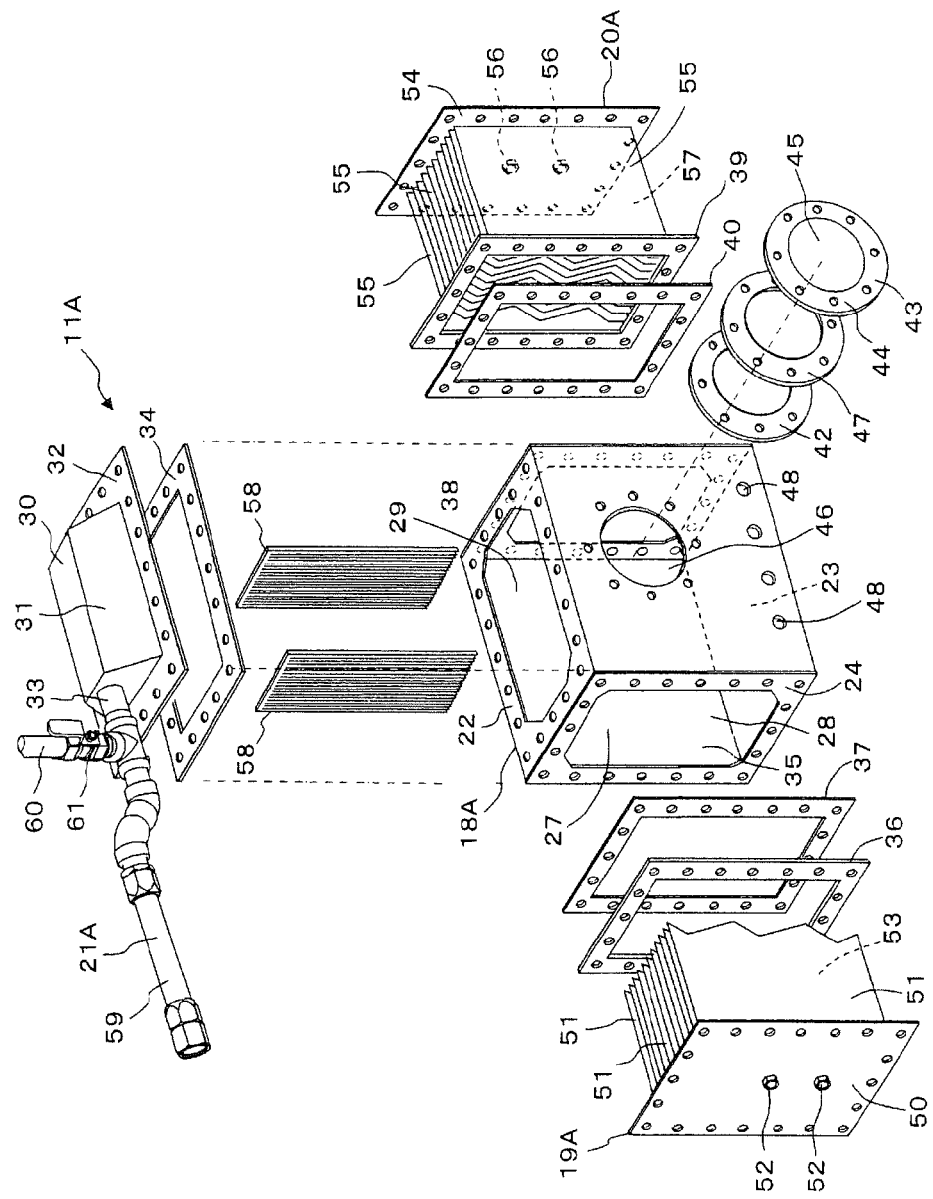
FIG. 4 is an exploded perspective view of the first electrolyzing device.
Figure 5:
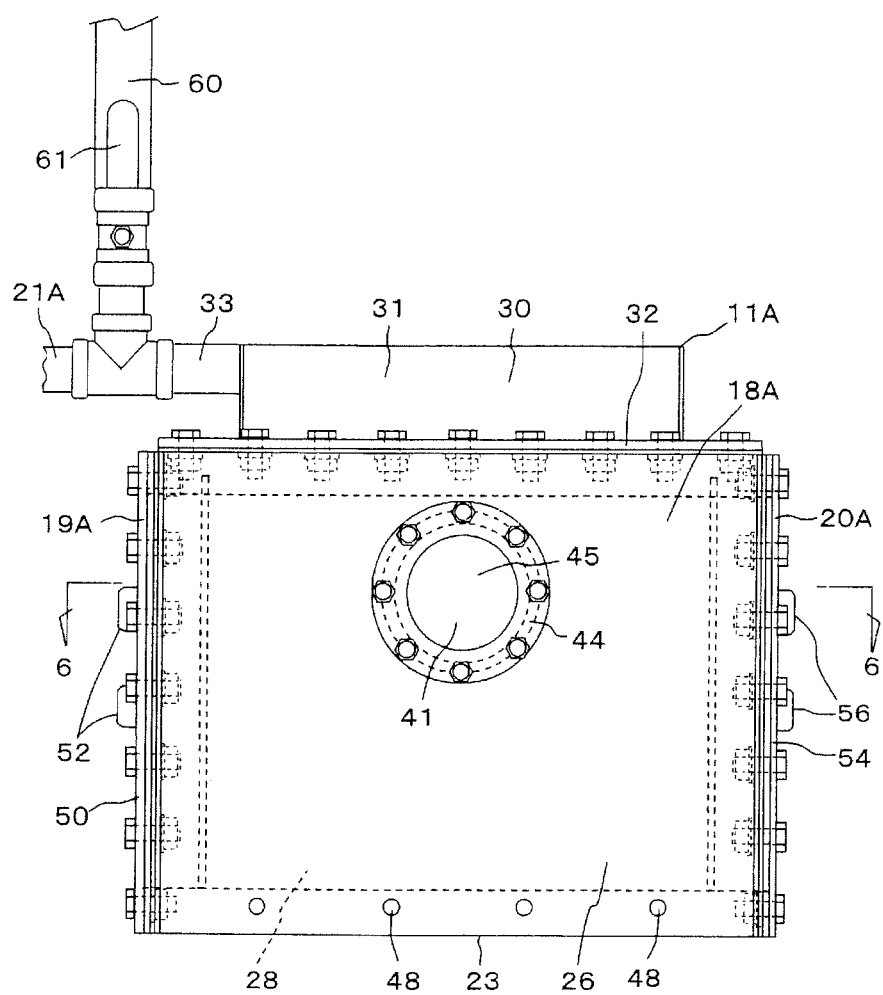
FIG. 5 is a side elevation of the first electrolyzing device.
Figure 6:
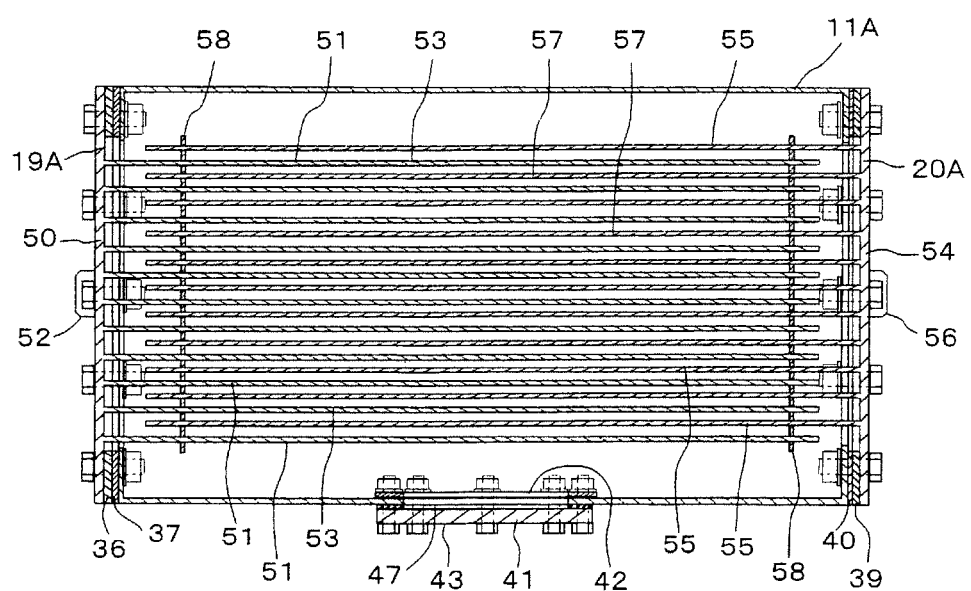
FIG. 6 is an end elevation taken along a line 6-6 in FIG. 5.
Figure 7:
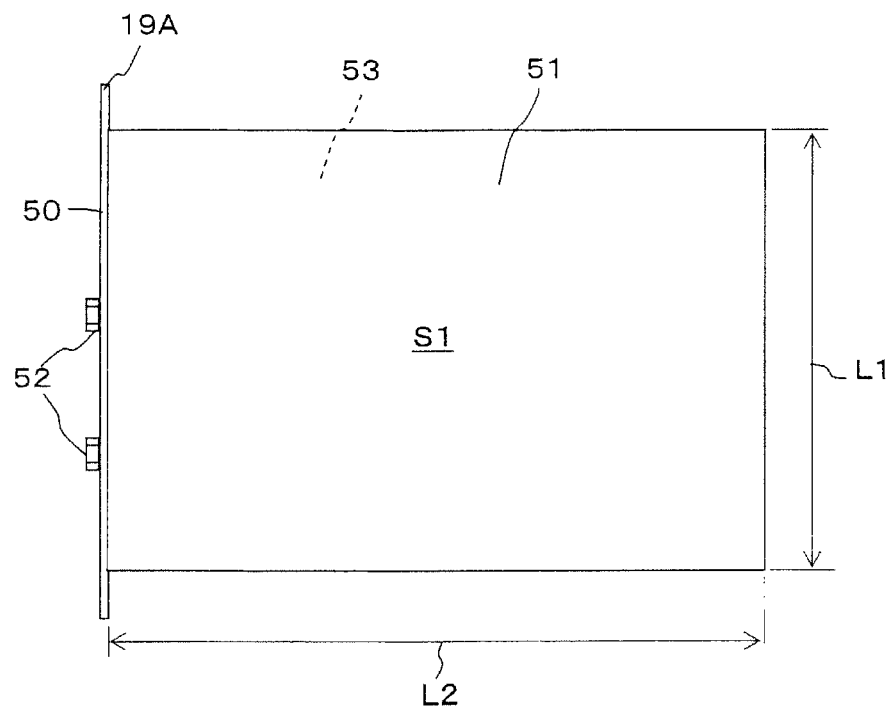
FIG. 7 is a side elevation of a first positive electrode.
Figure 8:
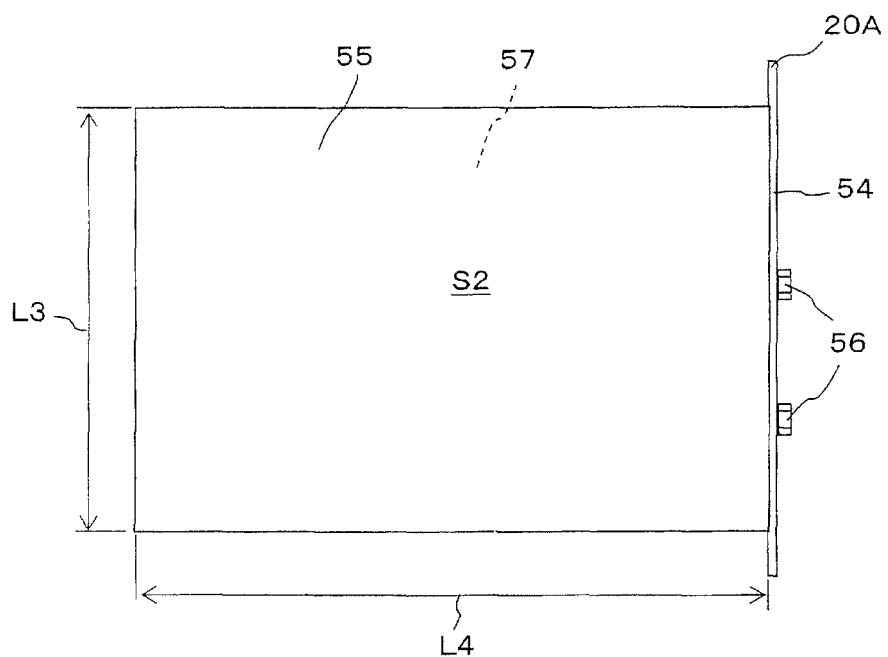
FIG. 8 is a side elevation of a first negative electrode.
Figure 9:
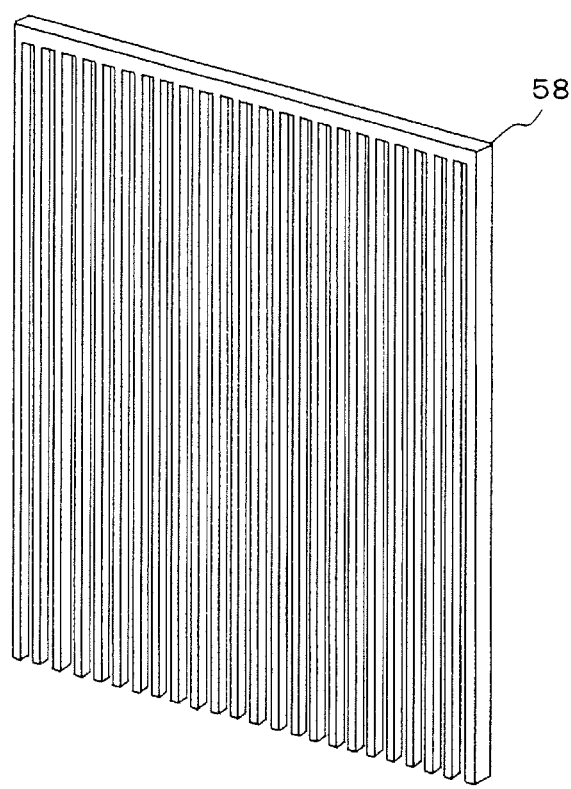
FIG. 9 is a perspective view of an insulator spacer.

With reference to the accompanying drawings, e.g., FIG. 1 as a schematic block diagram of an engine system 10A shown as an example and others, a detailed description of the engine system according to the present invention is as follows. It is to be noted that FIG. 2 is a perspective view showing a coupled state of a first electrolyzing device 11A, an engine 12, and a fuel tank 13, and FIG. 3 is a perspective view of the first electrolyzing device 11A. FIG. 4 is an exploded perspective view of the first electrolyzing device 11A, and FIG. 5 is aside elevation of the first electrolyzing device 11A. FIG. 6 is an end elevation taken along a line 6-6 in FIG. 5, and FIG. 7 is a side elevation of a first positive electrode 19A. FIG. 8 is a side elevation of the first negative electrode 20A, and FIG. 9 is a perspective view of an insulator spacer 62. In FIG. 2, a battery 14, an alternator 15, a boosting coil 16, and a distributer 17 or a direct ignition 17 are omitted. In FIG. 3, an up-and-down direction is represented by an arrow A, a lateral direction is represented by an arrow B, and a front-and-back direction is represented by an arrow C.

An engine system 10A includes a first electrolyzing device 11A, an engine 12, a fuel tank 13, a battery 14 (a lead storage battery), an alternator 15, a boosting coil 16 (an ignition coil), and a distributer 17 or a direct ignition 17. Although the engine system 10A (including an engine system 10S) is mounted in a vehicle (a car) (not shown), it can be used in not only a vehicle but also a ship that sails using the engine 12 or a locomotive that travels using the engine 12. It is to be noted that all members or components required in a drive system of a vehicle are existing ones, and hence they are omitted in the drawings or the description. Although FIG. 2 shows only one first electrolyzing device 11A, the plurality of first electrolyzing devices 11A may be installed.

The first electrolyzing device 11A has a first housing 18A, a first positive electrode 19A, a first negative electrode 20A, and a first supply mechanism 21A. The first electrolyzing device 11A decomposes water into hydrogen and oxygen by electrolysis, and generates a mixed gas having the hydrogen and the oxygen mixed therein. The first housing 18A is a hexahedron that has a square top wall 22 and a square bottom wall 23 that are long in the front-and-back direction, a square front wall 24 and a square rear wall 25 that are long in the up-and-down direction, and square both sidewalls 26 and 27 that are long in the front-and-back direction.

A first space 28A with a predetermined capacity surrounded by these walls 22 to 27 is defined in the first housing 18A. The first space 28A of the first housing 18A accommodates water (not shown) therein. A water level sensor (not shown) is installed in the first space 28A. The first housing 18A is made of aluminum or stainless, any other alloy, or reinforced plastic. A top portion opening 29 is formed in the top wall 22 of the first housing 18A, and the top portion opening 29 is air-tightly closed with a lid member 30.

The lid member 30 is formed of a dome section 31 that is convex upward, a fixed pedestal 32 that bulges from a lower end edge of the dome section 31 and overlaps a peripheral edge portion of the top wall 22 of the first housing 18A, and a connecting pipe 33 extending frontward from a front end of the dome section 31. The lid member 30 is firmly fixed to the top wall 22 of the first housing 18A through a square frame-like sealing material 34 (packing) made of rubber by a plurality of bolts and a plurality of nuts. Further, these bolts are inserted into bolt holes formed in the fixed pedestal 32 or the sealing material 34 of the lid member 30 and the peripheral edge portion of the top wall 22, and these nuts are screwed to shaft portions of these bolts. The lid member 30 is made of aluminum, stainless, any other alloy, or reinforced plastic.

A front portion opening 35 is formed in the front wall 24 of the first housing 18A, and this front portion opening 35 is air-tightly closed with the first positive electrode 19A (a positive energization plate 50). The first positive electrode 19A (the positive energization plate 50) is fixed to the front wall 24 of the first housing 18A through a square frame-like insulating plate 36 made of an synthetic resin and a square frame-like sealing material 37 (packing) in an insulating manner. The first positive electrode 19A is firmly fixed to the front wall 24 by a plurality of bolts and a plurality of nuts. These bolts are inserted into bolt holes formed in the peripheral edge portion of the first positive electrode 19A (the positive energization plate 50), the insulating plate 36, the sealing material 37, and the peripheral edge portion of the front wall 24, and these nuts are screwed to shaft portions of these nuts.

A rear portion opening 38 is formed in the rear wall 25 of the first housing 18A, and this rear portion opening 38 is air-tightly closed with the first negative electrode 20A (a negative energization plate 54). The first negative electrode 20A (the negative energization plate 54) is fixed to the rear wall 25 of the first housing 18A through a square frame-like insulating plate 39 made of a synthetic resin and a square frame-like sealing material 40 (packing) made of rubber in the insulating manner. The first negative electrode 20A is firmly fixed to the rear wall 25 by a plurality of bolts and a plurality of nuts. These bolts are inserted into bolt holes formed in a peripheral edge portion of the first negative electrode 20A (the negative energization plate 54), the insulating plate 39, the sealing material 40, and the peripheral edge portion of the rear wall 25, and these nuts are screwed to shaft portions of the bolts.

A confirmation window 41 through which the first space 28A can be visually confirmed is formed in the sidewall 26 of the first housing 18A. The confirmation window 41 is formed of an annular fixed plate 42 and a circular window member 43. The window member 43 is formed of an annular frame 44 and transparent circular glass 45 fitted in this frame 44. The fixed plate 42 or the frame 44 is made of aluminum, stainless, any other alloy, or reinforced plastic. In the confirmation window 41, the fixed plate 42 is arranged in the first space 28 (the inside) through a circular opening 46 formed in the sidewall 26 of the first housing 18A, and the window member 43 is arranged on the outer side of the sidewall 26.

The window member 43 is firmly fixed to the sidewall 26 of the first housing 18A through a frame-like sealing material 47 (packing) made of rubber by a plurality of bolts and a plurality of nuts. These bolts are inserted into bolt holes formed in the peripheral edge portion of the frame 44, a part of the opening 46 very close to the outer side, the sealing material 47, and the fixed plate 42, and these nuts are screwed to shaft portions of these bolts.

A plurality of vent holes 48 aligned in the front-and-back direction are formed in bottom portions of the sidewalls 26 and 27 of the first housing 18A, respectively. Air bubble generation nozzles (not shown) are disposed in these vent holes 48, and air feed pipes 49 are connected to these vent holes 48, respectively. The air feed pipes 49 are connected to an exhaust manifold 68 (see FIG. 12) forming an exhaust path of the engine 12. Exhaust oxygen discharged from the engine 12 flows into the air feed pipes 49 from the exhaust manifold 68, and the exhaust oxygen flows into the first space 28A of the first housing 18A from the air feed pipes 49.

The first positive electrode 19A is formed of a conductive positive energization plate 50 having a predetermined area and a predetermined thickness, and a plurality of conductive positive electrode plates 51. The positive energization plate 50 is formed into a square shape that has substantially the same shape and the same size as the front wall 24 of the first housing 18A and is long in the up-and-down direction. Positive pole terminals 52 to which a plug of a later-described electric cord 62A (a high-tension cord) is connected are provided at a central portion of the positive energization plate 50. Although the positive energization plate 50 is formed of an iron plate, it may be formed of not only the iron plate but also any other conductive metallic plate (e.g., a copper plate or a silver plate).

As shown in FIG. 7, each of these positive electrode plates 51 is formed into a square tabular shape as its planar shape, and has a facing surface 53 having a predetermined area. All the positive electrode plates 51 are formed into the same shape and the same size, and they are the same as later-described negative electrode plates 55 in shape and size, respectively. One end of each of these positive electrode plates 51 is electrically connected to the positive energization plate 51 in a state that these positive electrode plates 51 cross the positive energization plate 50 at a right angle.

These positive electrode plates 51 are accommodated in the first space 28A (the inside) of the first housing 18A, parallel to both the sidewalls 26 and 27 of the first housing 18A, and linearly extend from the positive energization plate 50 (the front wall 24 of the first housing 18A) toward the rear wall 25 of the first housing 18A. Although each positive electrode plate 51 is formed of the iron plate, it may be formed of not only the iron plate but also any other conductive metallic plate (e.g., a copper plate or a silver plate).

The first negative electrode 20A is formed of a conductive negative energization plate 54 having a predetermined area and a predetermined thickness, and a plurality of conductive negative electrode plates 55. The negative energization plate 54 is formed into a square shape that has substantially the same shape and the same size as the rear wall 25 of the first housing 18A and is long in the up-and-down direction. Negative pole terminals 56 to which a plug of an electric cord 62B (a high-tension cord) is connected are installed at a central portion of the negative energization plate 54. Although the negative energization plate 56 is formed of an iron plate, it may be formed of not only the iron plate but also any other conductive metallic plate (e.g., a copper plate or a silver plate).

As shown in FIG. 8, each of these negative electrode plates 55 is formed into a square tabular shape as its planar shape, and has a facing surface 57 having a predetermined area. All the negative electrode plates 55 are formed into the same shape and the same size, and they are the same as the positive electrode plates 51 in shape and size, respectively. One end of each of the negative electrode plates 55 is electrically connected to the negative energization plate 54 in a state that the negative electrode plates 55 cross the negative energization plate 54 at a right angle.

These negative electrode plates 55 are accommodated in the first space 28A (the inside) of the first housing 18A, arranged to be parallel to both the sidewalls 26 and 27 of the first housing 18A, and linearly extend from the negative energization plate 54 (the rear wall 25 of the first housing 18A) toward the front wall 24 of the first housing 18A. Although each negative electrode plate 55 is formed of the iron plate, it may be formed of not only the iron plate but also any other conductive metallic plate (e.g., a copper plate or a silver plate).

The positive electrode plates 51 and the negative electrode plates 55 are alternately aligned in a state where the positive electrode plates 51 are parallel to the negative electrode plates 55 so that the negative electrode plate 55 is placed between the positive electrode plates 51 which are adjacent to each other in the lateral direction and that the positive electrode plate 51 is placed between the negative electrode plates 55 which are adjacent to each other in the lateral direction. In these plates 51 and 55, the facing surfaces 53 of the positive electrode plates 51 and the facing surfaces 57 of the negative electrode plates 55 face the lateral direction.

An insulator spacer 58 is arranged between the positive electrode plates 51 and the negative electrode plates 55 extending toward the front wall 24 side of the first housing 18A. Further, the insulator spacer 58 is arranged between the positive electrode plates 51 and the negative electrode plates 55 extending toward the rear wall 25 side of the first housing 18A. These insulator spacers 58 are made of a synthetic resin, placed between these plates 51 and 55 adjacent to each other in the lateral direction, and extend in the up-and-down direction. The facing surfaces 53 and 57 of these plates 51 and 55 abut on these insulator spacers 58. The insulator spacers 58 hold the parallel state between the positive electrode plates 51 and the negative electrode plates 55, and also hold a clearance dimension between these plates 51 and 55 constant in the lateral direction.

The clearance dimension between the positive electrode plate 51 and the negative electrode plate 55 that are adjacent to each other in the lateral direction is in the range of 5 to 12 mm. If the clearance dimension is less than 5 mm, when the plates 51 and 55 are energized with electricity, electric discharge occurs between these plates 51 and 57 and the plates 51 and 55 are short-circuited in some cases, and electrolysis cannot be performed with the use of these plates 51 and 55. If the clearance dimension exceeds 12 mm, the positive electrode plates 51 or the negative electrode plates 55 cannot be closely arranged in the first space 28A (the inside) of the first housing 18A, and hydrogen and oxygen cannot be sufficiently generated with the use of these plates 51 and 55 when water is electrolyzed by the first electrolyzing device 11A.

In the first electrolyzing device 11A, since the clearance dimension between these plates 51 and 55 is in the above-described range, the plates 51 and 55 can be prevented from being short-circuited, these plates 51 and 55 can be closely arranged in the first space 28A of the first housing 18A, and sufficient amounts of hydrogen and oxygen can be generated with the use of these plates 51 and 55.

In each of these positive plate electrode plates 51, a length L1 of an end side extending in the up-and-down direction to be parallel to the front wall 24 or the rear wall 25 of the first housing 18A is in the range of 250 to 300 mm, and a length L2 of a lateral side extending in the front-and-back direction to be parallel to the top wall 22 or the bottom wall 23 of the first housing 18A is in the range of 400 to 700 mm. An area S1 of the facing surface 53 of each of these positive electrode plates 51 is in the range of 1000 to 2100 $cm^2$. A thickness dimension of each of these positive electrode plates 51 is in the range of 1 to 2 mm (see FIG. 7).

In each of these negative plate electrode plates 55, a length L3 of an end side extending in the up-and-down direction to be parallel to the front wall 24 or the rear wall 25 of the first housing 18A is in the range of 250 to 300 mm, and a length L4 of a lateral side extending in the front-and-back direction to be parallel to the top wall 22 or the bottom wall 23 of the first housing 18A is in the range of 400 to 700 mm. An area S2 of the facing surface 57 of each of these negative electrode plates 55 is in the range of 1000 to 2100 cm$^2$. A thickness dimension of each of these negative electrode plates 55 is in the range of 1 to 2 mm (see FIG. 8).

In the first electrolyzing device 11A, the length L1 of the end side of each positive electrode plate 51 is equal to the length L3 of the end side of each negative electrode plate 55, and the length L2 of the lateral side of each positive electrode plate 51 is equal to the length L4 of the lateral side of each negative electrode plate 55. Furthermore, the area S1 of the facing surface 53 of each positive electrode plate 51 is equal to the area S2 of the facing surface 57 of each negative electrode plate 55.

If the area of each of the facing surfaces 53 and 57 of these plates 51 and 55 is less than 1000 cm$^2$, the area of each facing surface of the plates 51 and 55 is small, a sufficient amount of hydrogen or oxygen cannot be generated with the use of these plates 51 and 55 when water is electrolyzed, and a sufficient amount of mixed gas cannot be generated in the first electrolyzing device 11A. If the area of each of the facing surfaces 53 and 57 of these plates 51 and 55 exceeds 2100 cm$^2$, the area of each of the facing surfaces 53 and 57 of the plates 51 and 55 is large beyond necessity, the first housing 18A accommodating these plates 51 and 55 must be increased in size, and the first electrolyzing device 11A cannot be reduced in size.

In the first electrolyzing device 11A, since the area of each of the facing surfaces 53 and 57 of these positive electrode plates 51 and these negative electrode plates 55 is in the above-described range, the first housing 18A does not have to be increased in size, sufficient amounts of hydrogen and oxygen can be generated with the use of these plates 51 and 55, and a sufficient amount of mixed gas can be generated in the first electrolyzing device 11A.

In the first electrolyzing device 11A, the number of the positive electrode plates 51 connected to the positive energization plate 50 is in the range of 10 to 25, and the number of the negative electrode plates 55 connected to the negative energization plate 56 is in the range of 10 to 25. It is to be noted that the number of the positive electrode plates 51 is equal to the number of the negative electrode plates 55. If the number of the plates 51 or 55 is less than 10, the number of these plates 51 or 55 is small, a sufficient amount of hydrogen or oxygen cannot be generated with the use of these plates 51 and 55 when water is electrolyzed, and a sufficient amount of mixed gas cannot be generated in the first electrolyzing device 11A. If the number of these plates 51 or 55 exceeds 25, the first housing 18A accommodating these plates 51 and 55 must be increased in size, and the first electrolyzing device 11A cannot be reduced in size.

In the first electrolyzing device 11A, since the number of these positive electrode plates 51 or these negative electrode plates 55 is in the above-described range, sufficient amounts of hydrogen and oxygen can be generated with the use of these plates 51 and 55 without increasing the first housing 11A beyond necessity, and a sufficient amount of mixed gas can be generated in the first electrolyzing device 11A.

The first supply mechanism 21A is formed of a supply pipe 59 coupled with the connecting pipe 33 of the lid member 30, a supply pump (not shown) that forcibly supplies a mixed gas generated in the first electrolyzing device 11A to intake manifolds (see FIG. 12) of the engine 12, and a filter (not shown) that removes impurities contained in the mixed gas. A water feed pipe 60 is coupled with the supply pipe 59 of the first supply mechanism 21A, and an electromagnetic valve 61 is installed. The water feed pipe 60 is coupled with the fuel tank 13.

Although a reciprocating engine is used as the engine 12, a rotary engine can be also used. A mixed gas of hydrogen and oxygen generated in the first electrolyzing device 11A is supplied to the engine 12. The engine 12 drives by combusting the mixed gas supplied from the first electrolyzing device 11A in each combustion chamber. Driving of the engine 12 is the same as that of a four-cycle engine. Water is stored in the fuel tank 13. A feed pump (not shown) and a water level sensor (not shown) connected to a fuel gauge are installed in the fuel tank 13.

When the feed pump is operated, the water stored in the fuel tank 13 is supplied to the electromagnetic valve 61 of the supply pipe 59 through the water feed pipe 60. It is to be noted that, when a valve mechanism of the electromagnetic valve 61 is closed on the supply pipe 59 side and opened on the water feed pipe 60, the water stored in the fuel tank 13 is supplied to the first electrolyzing device 11A (the first space 28A of the first housing 18A) through the feed pump.

The battery 14 energizes the boosting coil 16 with electricity, and stores electricity generated by the alternator 15. The alternator 15 generates the electricity by using rotation of a crank shaft of the engine 12, and energizes the battery 14 with the generated electricity. The boosting coil 16 (an ignition coil) energizes the first electrolyzing device 11A with boosted high-voltage electricity while boosting a voltage of the electricity stored in the battery 14, and also energizes an ignition plug of the engine 12. The distributor 17 mechanically detects the number of revolutions of the engine 12, and adjusts timing of producing a spark with the use of the ignition plug. Furthermore, the direct ignition 17 detects the number of revolutions of the engine 12 by using a sensor, and energizes the ignition plug.

Figure 10:
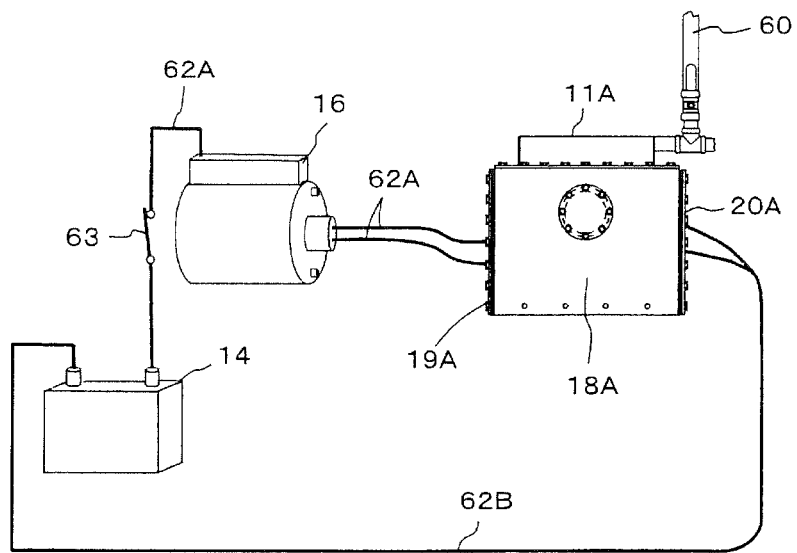
FIG. 10 is a view for explaining energization of the first electrolyzing device with electricity from a battery.
Figure 11:
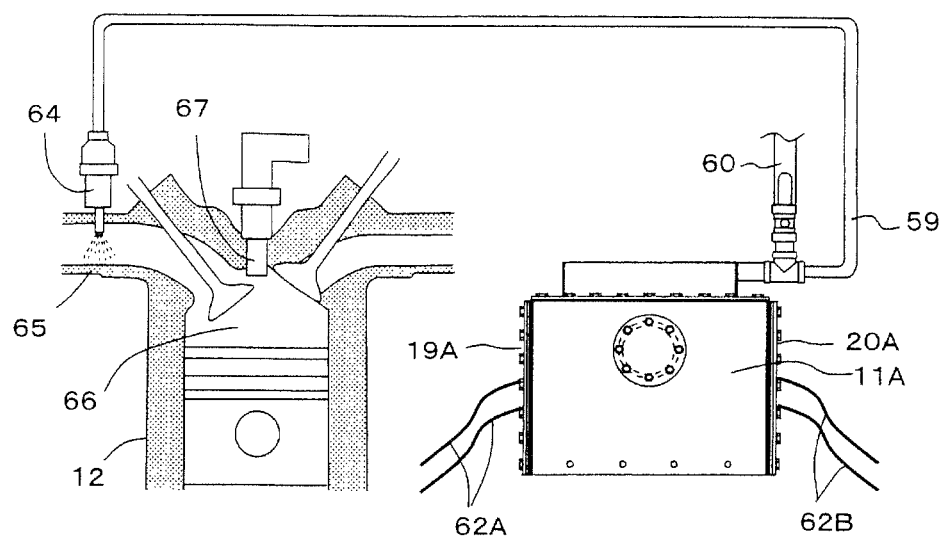
FIG. 11 is a view for explaining injection of a mixed gas into the engine.
Figure 12:
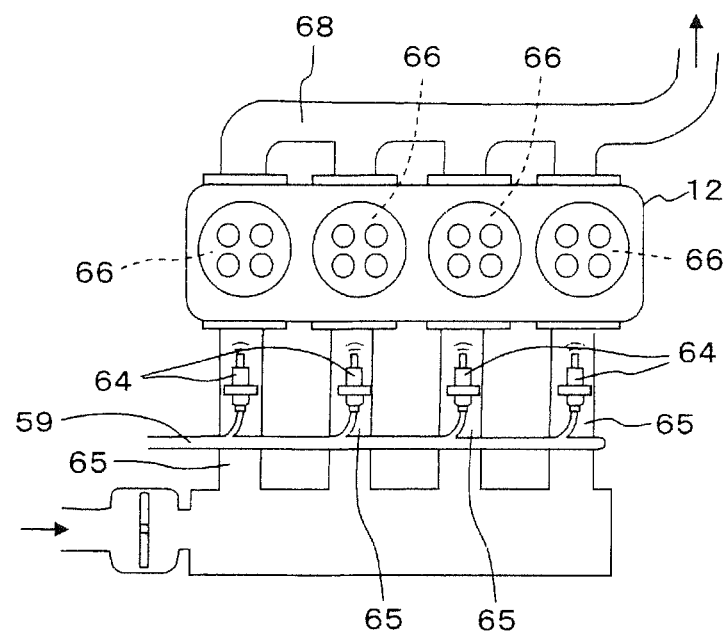
FIG. 12 is a view for explaining injection of the mixed gas into the engine.
Figure 13:
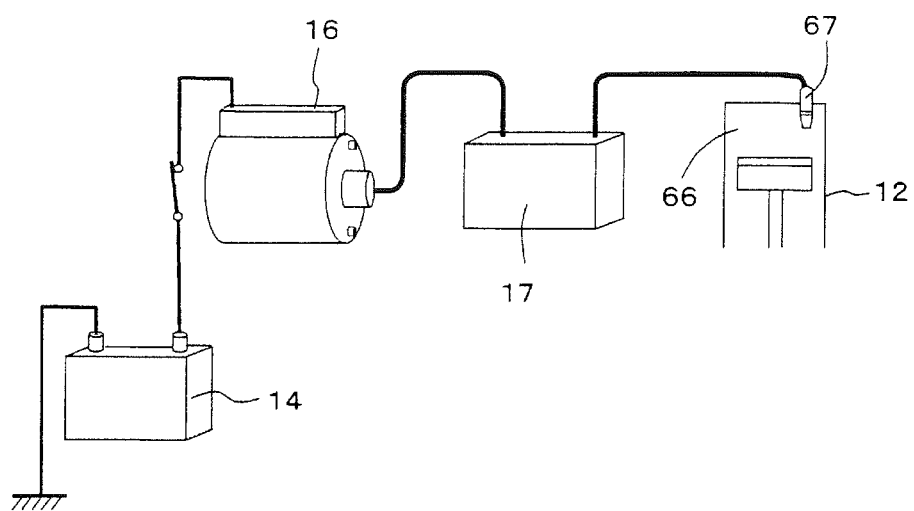
FIG. 13 is a view for explaining a flow of electricity in an ignition system.

FIG. 10 is a view for explaining energization of the first electrolyzing device 11A with the electricity from the battery 14, and FIGS. 11 and 12 are views for explaining supply of the mixed gas to the engine 12. FIG. 13 is a view for explaining a flow of the electricity in an ignition system. It is to be noted that a predetermined amount of water is accommodated in the first electrolyzing device 11 (the first space 28A of the first housing 18). Electric cords 62A and 62B are electrically connected to a positive pole and a negative pole of the battery 14. The electric cord 62B extending from the negative pole of the battery 14 has a plug electrically connected to the negative pole terminals 56 of the first housing 18A.

The electric cord 62A extending from the positive pole of the battery 14 is electrically connected to an input side of the boosting coil 16. A switch 63 is disposed in the electric cord 62A. Energization of the first electrolyzing device 11A with the electricity is turned on/off by turning on/off the switch 63. The electric cord 62A (a high-tension cord) is electrically connected to an output side of the boosting coil 16. The electric cord 62A has a plug electrically connected to the positive pole terminals 52 of the positive energization plate 50.

When the switch 63 is in an ON state, the electricity from the battery 14 is boosted to a predetermined high voltage in the boosting coil 16, and the first electrolyzing device 11A is energized with the high-voltage electricity. In the first electrolyzing device 11A, the positive electricity flows from the positive pole terminals 52 to the first positive energization plate 50 and each positive electrode plate 51, the negative electricity flows from the negative pole terminals 56 to the first negative energization plate 54 and each negative electrode plate 55, and the water accommodated in the first space 28A is electrolyzed.

Hydrogen ions and oxygen molecules are generated from each positive electrode plate 51, and hydrogen molecules are generated from each negative electrode plate 55. The oxygen molecules or the hydrogen molecules move to the dome section 31 of the lid member 30 from the water. In the dome section 31, the oxygen and the hydrogen are mixed to generate the mixed gas. When the valve mechanism of the electromagnetic valve 61 is opened on the supply pipe 59 side, the mixed gas is forcibly supplied to injectors 64 of the engine 12 through the supply pipe 59. As shown in FIG. 11 and FIG. 12, the mixed gas supplied to the injectors 64 is injected into the intake manifolds 65 from the injectors 64, and flows into the combustion chambers 66 of the engine 12 via the intake manifolds 65.

Although an amount of the water accommodated in the first space 28A is reduced due to the electrolysis in the first electrolyzing device 11A, a water level in the first space 28A is measured by a water level sensor, the feed pump is operated upon a reduction of the water level in the first space 28A measured by the water level sensor to a limit water level, and the water is fed to the first electrolyzing device 11A (the first space 28A of the first housing 18A) from the fuel tank 13. It is to be noted that the water is fed from the fuel tank 13 to the first space 28A during stop of the engine 12. When the water level in the first space 28A is restored by feeding water, the feed pump is stopped, and the supply of the water from the fuel tank 13 is stopped. When the supply of the water is stopped, the valve mechanism of the electromagnetic valve 61 is opened on the supply pipe 59 side, and closed on the water feed pipe 60 side.

In the ignition system, as shown in FIG. 13, the electricity of the battery 14 is boosted by the boosting coil 16, the high-voltage electricity is allowed to flow to the ignition plug 67 at predetermined timing by the distributer 17 or the direct ignition 17, and a spark is produced from the ignition plug 67. The mixed gas that has flowed into the combustion chambers 66 is ignited by the spark produced from the ignition plug 67, the mixed gas is combusted (exploded) in the combustion chambers 66, pistons of the engine 12 move up and down, and the crank shaft rotates. During driving of the engine 12, the alternator 15 generates electricity based on the rotation of the crank shaft, and energizes the battery 14 with the generated electricity.

The mixed gas combusted in the combustion chambers 66 of the engine 12 is converted into water and exhaust oxygen by a chemical reaction. The exhaust oxygen flows into an exhaust manifold 68 of the engine 12 and is then discharged to outside air through a muffler, and a part of the exhaust oxygen flows into the air feed pipes 49 from the exhaust manifold 68 and flows into the first space 28A of the first housing 18A through the vent holes 48 in the bottom portion of the sidewall 26 from the air feed pipes 49.

The exhaust oxygen that has flowed into the first space 28A turns to fine many air bubbles by an air bubble generation nozzle. These air bubbles are discharged into the water accommodated in the first space 28A. In the first electrolyzing device 11A, the water accommodated in the first housing 18A is stirred by the fine air bubbles discharged into the water, the hydrogen molecules or the oxygen molecules generated by the electrolysis are stirred, and the mixed gas in which the hydrogen molecules and the oxygen molecules are mixed is created in the first housing 18A. In the system 10A, since the hydrogen and the oxygen can be stirred by using the exhaust oxygen, and the mixed gas in which the hydrogen and the oxygen are mixed can be created in the first housing 18A. Moreover, besides the hydrogen and the oxygen generated in the first housing 18A, the exhaust oxygen can be used, and a mixed gas containing this exhaust oxygen can be created.

In the engine system 10A, since the water is electrolyzed into the hydrogen and the oxygen by these positive electrode plates 51 and the negative electrode plates 51 and the mixed gas of the hydrogen and the oxygen is generated in the first electrolyzing device 11A, the hydrogen or the oxygen does not have to be additionally supplied from a tank, the tank containing the hydrogen or the oxygen does not have to be installed, and the engine 12 can be driven by simply supplying the water to the first electrolyzing device 11A. Further, since the alternator 15 that energizes the battery 14 with the electricity generated by driving of the engine 12 using the mixed gas is provided, the electricity can be generated by just supplying the water, and the battery 14 can be energized with the generated electricity.

In the engine system 10A, since the mixed gas of the hydrogen and the oxygen is combusted in the engine 12, the oxygen and the water alone are discharged after the combustion, an exhaust gas containing $CO^2$, NOX, or MOX is not discharged, and the environmental destruction or the global warming can be avoided. According to the engine system 10A, refilling stands to refill with the hydrogen or the oxygen do not have to be constructed, infrastructures to operate the system 10A do not have to be developed, safety measures in the refilling stands do not have to be taken, and hence costs or time to develop the infrastructures can be reduced, thus saving costs or time required for the safety measures. In the engine system 10A, although the water is consumed for consumption of the hydrogen and the oxygen, the engine 12 can be driven by just refilling with the water corresponding to an consumed amount, and hence unnecessary labor or time can be eliminated.

Figure 14:
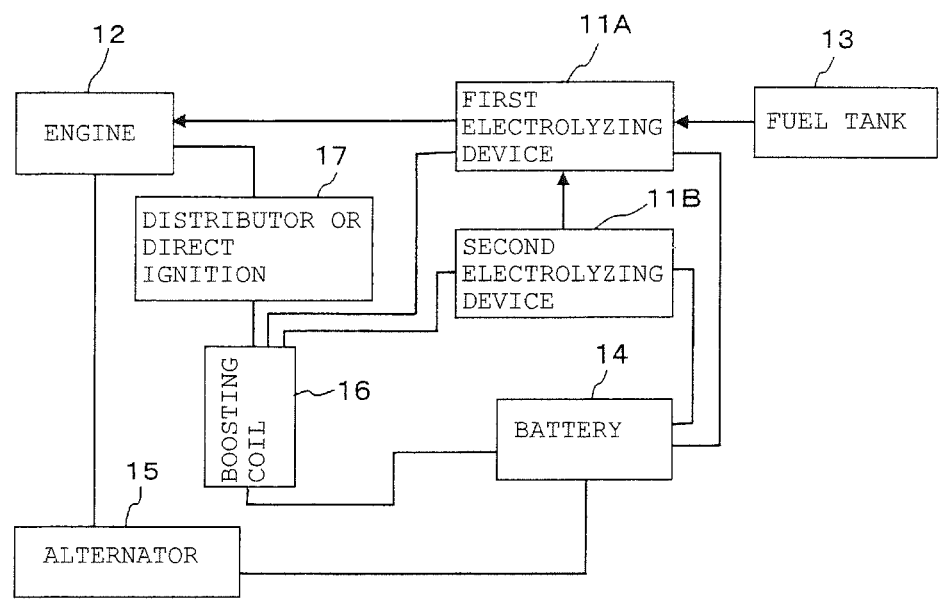
FIG. 14 is a schematic block diagram of an engine system as another example.
Figure 15:
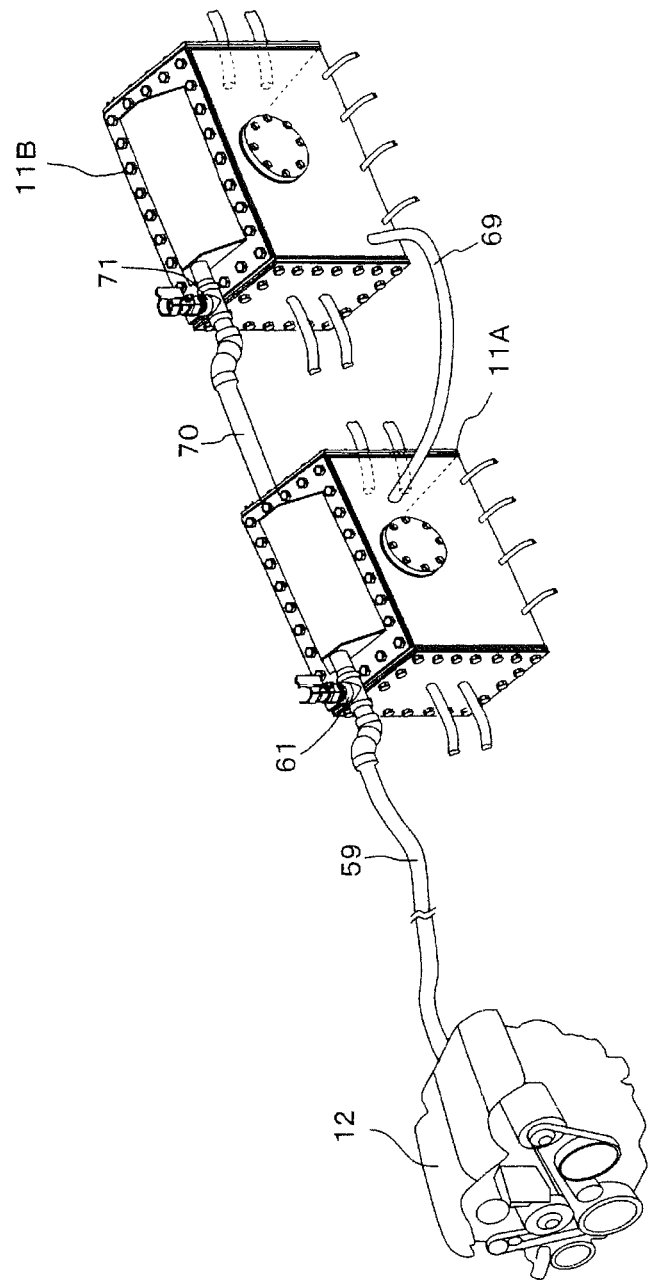
FIG. 15 is a perspective view showing a coupled state of a first electrolyzing device, a second electrolyzing device, and an engine.
Figure 16:
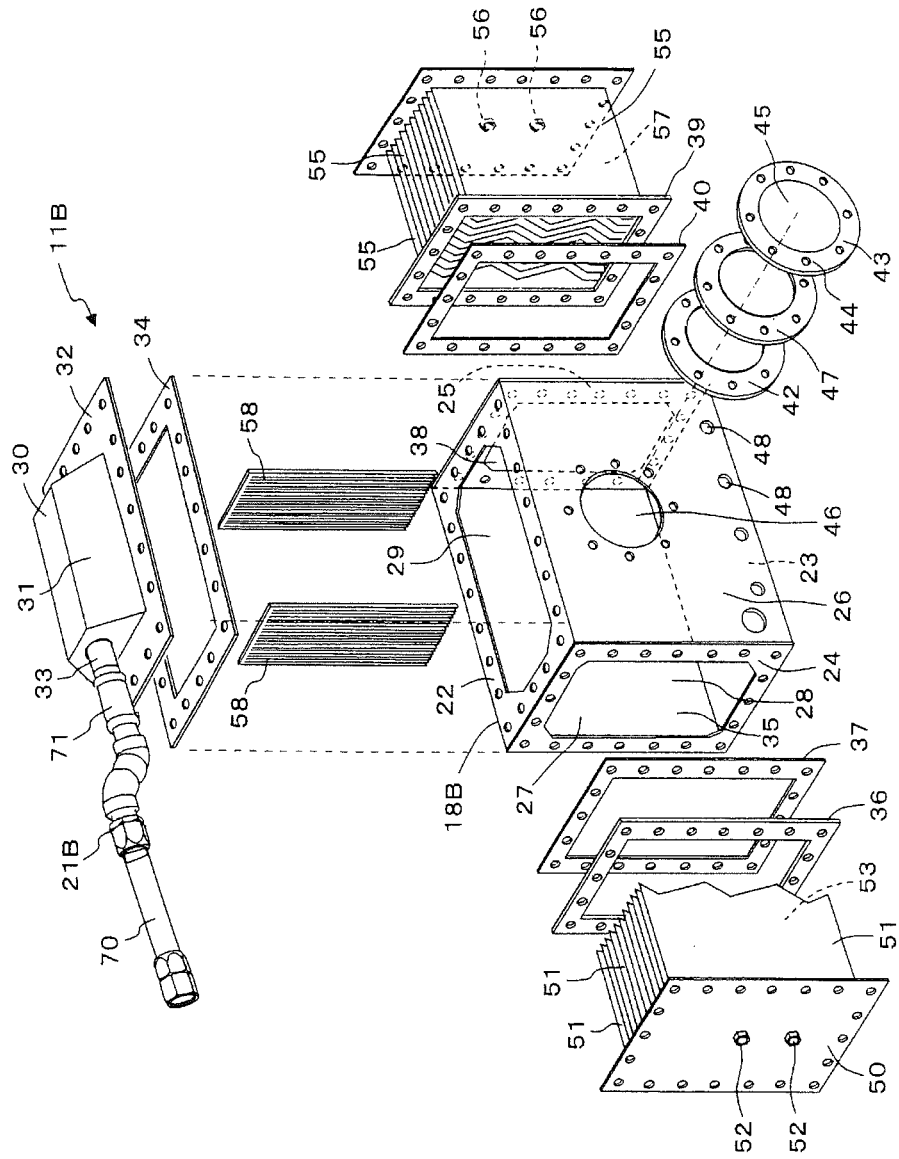
FIG. 16 is an exploded perspective view of the second electrolyzing device.
Figure 17:
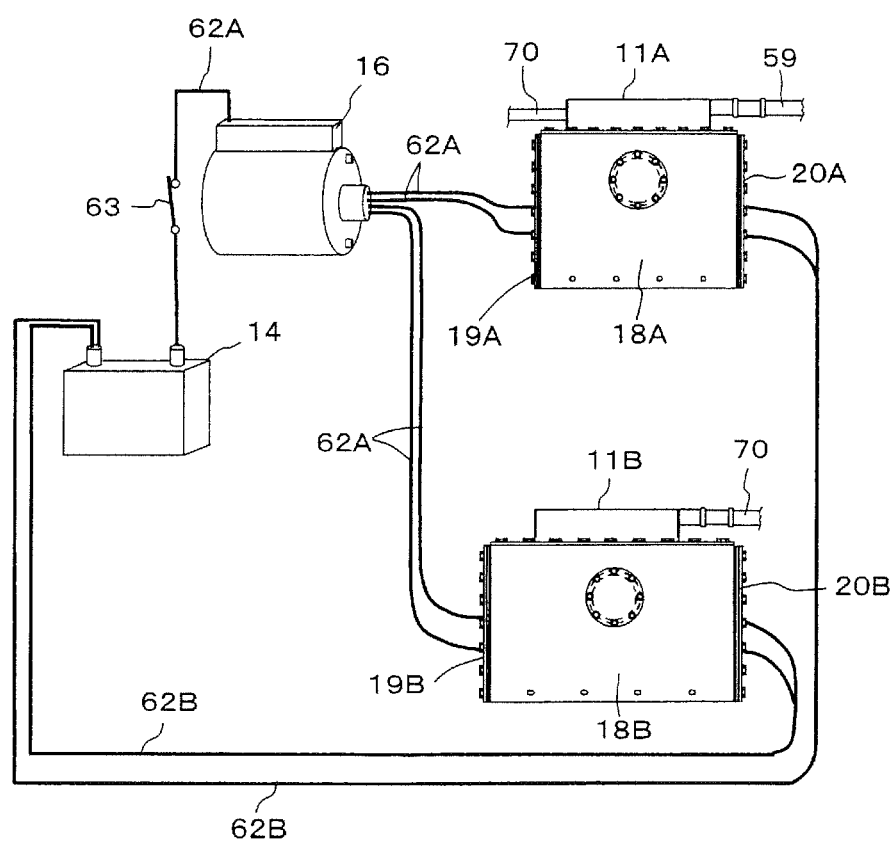
FIG. 17 is a view for explaining the battery to the first electrolyzing device, and energization of to the first electrolyzing device with electricity.
Figure 18:
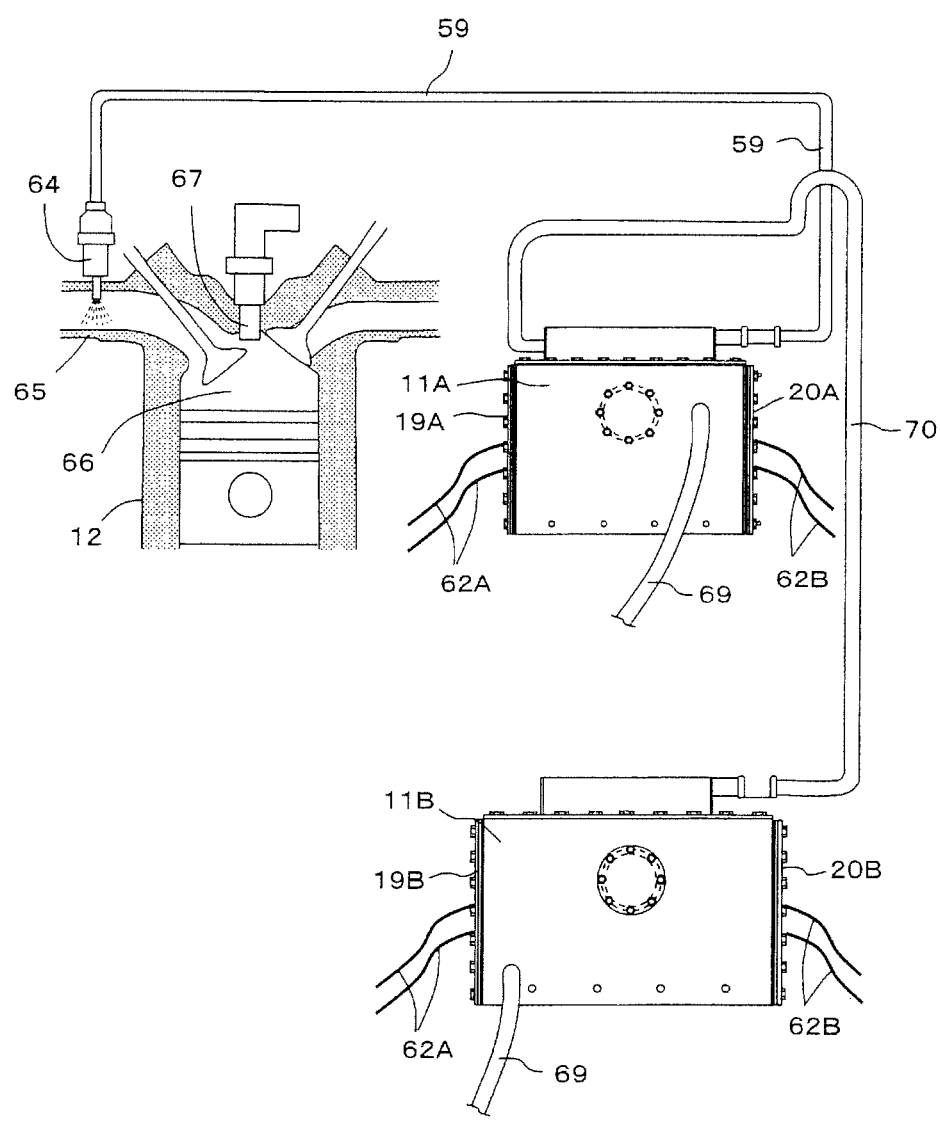
FIG. 18 is a view for explaining injection of a mixed gas into the engine.

FIG. 14 is a schematic block diagram of an engine system 10B as another example, and FIG. 15 is a perspective view showing a coupled state of a first electrolyzing device 11A, a second electrolyzing device 11B, and an engine 12. FIG. 16 is an exploded perspective view of the second electrolyzing device 11B, and FIG. 17 is a view for explaining energization of the first electrolyzing device 11A and the second electrolyzing device 11B from the battery 14. FIG. 18 is a view for explaining supply of a mixed gas to the engine 12. In FIG. 15, the battery 14, an alternator 15, a boosting coil 16, and a distributor 17 or a direct ignition 17 are omitted.

The engine system 10B includes a first electrolyzing device 11A, a second electrolyzing device 113, an engine 12, a battery 14 (a lead storage battery), an alternator 15, a boosting coil 16 (an ignition coil), and a distributor 17 or a direct ignition 17. The first electrolyzing device 11A used in this system 10B is different from the first electrolyzing device 11A of the system 10A shown in FIG. 1 in that a water feed pipe is not coupled with a supply pipe 59 of a first supply mechanism 21A and in that a coupling pipe 70 is coupled with a rear end of a dome section 31 of a lid member 30. It is to be noted that other structures of the first electrolyzing device 11A excluding these points are the same as those used in the system 10A in FIG. 1, and hence a description thereof will be omitted. Although FIG. 16 shows the single first electrolyzing device 11A and the single second electrolyzing device 113 alone, but the plurality of first electrolyzing devices 11A or the plurality of second electrolyzing devices 11B may be installed.

The second electrolyzing device 11B supplies a mixed gas generated therein to the first electrolyzing device 11A, and supplies water stored therein to the first electrolyzing device 11A. The second electrolyzing device 11B has a second housing 18B, a second positive electrode 19B, a second negative electrode 20B, and a second supply mechanism 21B. The second electrolyzing device 11B decomposes water into hydrogen and oxygen by electrolysis, and generates a mixed gas in which the hydrogen and the oxygen are mixed. The second housing 18B is a hexahedron having a square top wall 22 and a square bottom wall 23 that are long in the front-and-back direction, a square front wall 24 and a square rear wall 25 that are long in the up-and-down direction, and both square sidewalls 26 and 27 that are long in the front-and-back direction.

A second space 283 with a predetermined capacity surrounded by these walls 22 to 27 is defined in the second housing 18B. Water (not shown) is stored in the second space 28B. The capacity of the second space 28B is larger than that of the first space 28A of the first housing 18A. Thus, an amount of water stored in the second space 28B is larger than an amount of water stored in the first space 28A. A water level sensor (not shown) connected to a fuel gauge is installed in the second space 28B. The second housing 18 is made of aluminum, stainless, any other alloy, or reinforced plastic. A top portion opening 29 is formed in the top wall 22 of the second housing 18B, and the top portion opening 29 is air-tightly closed with the lid member 30.

The lid member 30 is formed of a dome section 31 that is convex upward, a fixed pedestal 32 that bulges from a lower end edge of the dome section 31 and overlaps a peripheral edge portion of the top wall 22 of the first housing 18A, and a connecting pipe 33 extending frontward from a front end of the dome section 31. The lid member 30 is firmly fixed to the top wall 22 of the second housing 183 through a square frame-like sealing material (packing) 34 made of rubber by a plurality of bolts and a plurality of nuts. Further, these bolts are inserted into a bolt holes formed in the fixed pedestal 32 or the sealing material 34 of the lid member 30 and the peripheral edge portion of the top wall 22 of the second housing 18B, and these nuts are screwed to shaft portions of these bolts. The lid member 30 is made of aluminum, stainless, any other alloy, or reinforced plastic.

A front portion opening 35 is formed in the front wall 24 of the second housing 18B, and this front portion opening 35 is air-tightly closed with the second positive electrode 19B (a positive energization plate 50). The second positive electrode 19B (the positive energization plate 50) is fixed to the front wall 24 of the second housing 18B through a square frame-like insulating plate 36 made of an synthetic resin and a square frame-like sealing material 37 (packing) made of rubber in an insulating manner. The second positive electrode 19B is firmly fixed to the front wall 24 by a plurality of bolts and a plurality of nuts. These bolts are inserted into bolt holes formed in the peripheral edge portion of the second positive electrode 19B (the positive energization plate 50), the insulating plate 36, the sealing material 37, and the peripheral edge portion of the front wall 24 of the second housing 18B, and these nuts are screwed to shaft portions of these nuts.

A rear portion opening 38 is formed in the rear wall 25 of the second housing 18B, and this rear portion opening 38 is air-tightly closed with the second negative electrode 20B (a negative energization plate 54). The second negative electrode 20B (the negative energization plate 54) is fixed to the rear wall 25 of the second housing 18B through a square frame-like insulating plate 39 made of a synthetic resin and a square frame-like sealing material 40 (packing) made of rubber in the insulating manner. The second negative electrode 20B is firmly fixed to the rear wall 25 by a plurality of bolts and a plurality of nuts. These bolts are inserted into bolt holes formed in a peripheral edge portion of the second negative electrode 20B (the negative energization plate 54), the insulating plate 39, the sealing material 40, and the peripheral edge portion of the rear wall 25 of the second housing 18B, and these nuts are screwed to shaft portions of the bolts.

A confirmation window 41 through which the second space 28B can be visually confirmed is formed in the sidewall 26 of the second housing 18B. The confirmation window 41 is formed of an annular fixed plate 42 and a circular window member 43. The window member 43 is formed of an annular frame 44 and transparent circular glass 45 fitted in this frame 44. The fixed plate 42 or the frame 44 is made of aluminum, stainless, any other alloy, or reinforced plastic. In the confirmation window 41, the fixed plate 42 is arranged in the second space 28B (the inside) to sandwich a circular opening 46 formed in the sidewall 26 of the second housing 18B, and the window member 43 is arranged on the outer side of the sidewall 26.

The window member 43 is firmly fixed to the sidewall 26 of the second housing 18A through a frame-like sealing material 47 (packing) made of rubber by a plurality of bolts and a plurality of nuts. These bolts are inserted into bolt holes formed in the peripheral edge portion of the frame 44, a part of the opening 46 very close to the outer side, the sealing material 47, and the fixed plate 42, and these nuts are screwed to shaft portions of these bolts.

A plurality of vent holes 48 aligned in the front-and-back direction are formed in bottom portions of the sidewalls 26 and 27 of the second housing 18B, respectively. Air bubble generation nozzles (not shown) are disposed in these vent holes 48, and air feed pipes 49 are connected to these vent holes 48, respectively. The air feed pipes 49 are connected to an exhaust manifold 68 (see FIG. 12) forming an exhaust path of the engine 12. Exhaust oxygen discharged from the engine 12 flows into the air feed pipes 49 from the exhaust manifold 68, and the exhaust oxygen flows into the second space 28B of the second housing 18B from the air feed pipes 49. A water feed pipe 69 having a feed pump (not shown) disposed thereto is coupled with the bottom portion of the sidewall 26 of the second housing 18B. The water feed pipe 69 is coupled with the sidewall 26 of the second housing 18B.

The second positive electrode 19B is formed of a conductive positive energization plate 50 having a predetermined area and a predetermined thickness, and a plurality of conductive positive electrode plates 51. The positive energization plate 50 is formed into a square shape that has substantially the same shape and the same size as the front wall 24 of the second housing 18B and is long in the up-and-down direction. Positive pole terminals 52 to which a plug of an electric cord 62A (a high-tension cord) is connected are provided at a central portion of the positive energization plate 50. Although the positive energization plate 50 is formed of an iron plate, it may be formed of not only the iron plate but also any other conductive metallic plate (e.g., a copper plate or a silver plate).

Each of these positive electrode plates 51 is formed into a square tabular shape as its planar shape, and has a facing surface 53 having a predetermined area (refer to FIG. 7). All the positive electrode plates 51 are formed into the same shape and the same size, and they are the same as later-described negative electrode plates 55 in shape and size, respectively. One end of each of these positive electrode plates 51 is electrically connected to the positive energization plate 51 in a state that these positive electrode plates 51 cross the positive energization plate 50 at a right angle.

These positive electrode plates 51 are accommodated in the second space 28B (the inside) of the second housing 18B, parallel to both the sidewalls 26 and 27 of the second housing 18B, and linearly extend from the positive energization plate 50 (the front wall 24 of the second housing 18B) toward the rear wall 25 of the second housing 18B. Although each positive electrode plate 51 is formed of the iron plate, it may be formed of not only the iron plate but also any other conductive metallic plate (e.g., a copper plate or a silver plate).

The second negative electrode 20B is formed of a conductive negative energization plate 54 having a predetermined area and a predetermined thickness, and a plurality of conductive negative electrode plates 55. The negative energization plate 54 is formed into a square shape that has the same shape and the same size as the rear wall 25 of the second housing 18B and is long in the up-and-down direction. Negative pole terminals 56 to which a plug of an electric cord 62B (a high-tension cord) is connected are installed at a central portion of the negative energization plate 54. Although the negative energization plate 56 is formed of an iron plate, it may be formed of not only the iron plate but also any other conductive metallic plate (e.g., a copper plate or a silver plate).

Each of these negative electrode plates 55 is formed into a square tabular shape as its planar shape, and has a facing surface 57 having a predetermined area (refer to FIG. 8). All the negative electrode plates 55 are formed into the same shape and the same size, and they are the same as the positive electrode plates 51 in shape and size, respectively. One end of each of the negative electrode plates 55 is electrically connected to the negative energization plate 54 in a state that the negative electrode plates 55 cross the negative energization plate 54 at a right angle.

These negative electrode plates 55 are accommodated in the second space 28B (the inside) of the second housing 18B, arranged to be parallel to both the sidewalls 26 and 27 of the second housing 18B, and linearly extend from the negative energization plate 54 (the rear wall 25 of the second housing 18B) toward the front wall 24 of the second housing 18B. Although each negative electrode plate 55 is formed of the iron plate, it may be formed of not only the iron plate but also any other conductive metallic plate (e.g., a copper plate or a silver plate).

The positive electrode plates 51 and the negative electrode plates 55 are alternately aligned in a state where the positive electrode plates 51 are parallel to the negative electrode plates 55 so that the negative electrode plate 55 is placed between the positive electrode plates 51 which are adjacent to each other in the lateral direction and that the positive electrode plate 51 is placed between the negative electrode plates 55 which are adjacent to each other in the lateral direction. In these plates 51 and 55, the facing surfaces 53 of the positive electrode plates 51 and the facing surfaces 57 of the negative electrode plates 55 face the lateral direction.

An insulator spacer 58 is arranged between the positive electrode plates 51 and the negative electrode plates 55 extending toward the front wall 24 side of the second housing 18B. Further, the insulator spacer 58 is arranged between the positive electrode plates 51 and the negative electrode plates 55 extending toward the rear wall 25 side of the second housing 18B. These insulator spacers 58 are made of a synthetic resin, placed between these plates 51 and 55 adjacent to each other in the lateral direction, and extend in the up-and-down direction. The facing surfaces 53 and 57 of these plates 51 and 55 abut on these insulator spacers 58. The insulator spacers 58 hold the parallel state between the positive electrode plates 51 and the negative electrode plates 55, and also hold a clearance dimension between these plates 51 and 55 in the lateral direction.

In the second electrolyzing device 11B, the clearance dimension between the positive electrode plate 51 and the negative electrode plate 55 that are adjacent to each other in the lateral direction is in the range of 5 to 12 mm. If the clearance dimension is less than 5 mm, when the plates 51 and 55 are energized with electricity, electric discharge occurs between these plates 51 and 57 and the plates 51 and 55 are short-circuited in some cases, and hence electrolysis cannot be performed with the use of these plates 51 and 55. If the clearance dimension exceeds 12 mm, the positive electrode plates 51 or the negative electrode plates 55 cannot be closely arranged in the second space 28B (the inside) of the second housing 18B, and hydrogen and oxygen cannot be sufficiently generated with the use of these plates 51 and 55 when water is electrolyzed by the second electrolyzing device 11B.

In the second electrolyzing device 11B, since the clearance dimension between these plates 51 and 55 is in the above-described range, the plates 51 and 55 can be prevented from being short-circuited, these plates 51 and 55 can be closely arranged in the second space 28B of the second housing 18B, and sufficient amounts of hydrogen and oxygen can be generated with the use of these plates 51 and 55.

In each of these positive plate electrode plates 51, a length L1 of an end side extending in the up-and-down direction to be parallel to the front wall 24 or the rear wall 25 of the second housing 18B is in the range of 250 to 300 mm, and a length L2 of a lateral side extending in the front-and-back direction to be parallel to the top wall 22 or the bottom wall 23 of the second housing 18B is in the range of 600 to 850 mm. An area S1 of the facing surface 53 of each of these positive electrode plates 51 is in the range of 1500 to 2550 cm$^2$. A thickness dimension of each of these positive electrode plates 51 is in the range of 1 to 2 mm (refer to FIG. 7).

In each of these negative plate electrode plates 55, a length L3 of an end side extending in the up-and-down direction to be parallel to the front wall 24 or the rear wall 25 of the second housing 18B is in the range of 250 to 300 mm, and a length L4 of a lateral side extending in the front-and-back direction to be parallel to the top wall 22 or the bottom wall 23 of the second housing 18B is in the range of 600 to 850 mm. An area S2 of the facing surface 57 of each of these negative electrode plates 55 is in the range of 1500 to 2550 cm$^2$. A thickness dimension of each of these negative electrode plates 55 is in the range of 1 to 2 mm (refer to FIG. 8).

In the second electrolyzing device 11B, the length L1 of the end side of each positive electrode plate 51 is equal to the length L3 of the end side of each negative electrode plate 55, and the length L2 of the lateral side of each positive electrode plate 51 is equal to the length L4 of the lateral side of each negative electrode plate 55. Furthermore, the area S1 of the facing surface 53 of each positive electrode plate 51 is equal to the area S2 of the facing surface 57 of each negative electrode plate 55.

If the area of each of the facing surfaces 53 and 57 of these plates 51 and 55 is less than 1500 cm$^2$, the area of each facing surface of the plates 51 and 55 is small, a sufficient amount of hydrogen or oxygen cannot be generated with the use of these plates 51 and 55 when water is electrolyzed, and a sufficient amount of mixed gas cannot be supplied to the first electrolyzing device 11A. If the area of each of the facing surfaces 53 and 57 of these plates 51 and 55 exceeds 2550 cm², the area of each of the facing surfaces 53 and 57 of the plates 51 and 55 is large beyond necessity, the second housing 18B accommodating these plates 51 and 55 must be increased in size, and the second electrolyzing device 11B cannot be reduced in size.

In the second electrolyzing device 11B, since the area of each of the facing surfaces 53 and 57 of these positive electrode plates 51 and these negative electrode plates 55 is in the above-described range, the second housing 18B does not have to be increased in size, sufficient amounts of hydrogen and oxygen can be generated with the use of these plates 51 and 55, and a sufficient amount of mixed gas can be supplied to the first electrolyzing device 11A.

In the second electrolyzing device 11B, the number of the positive electrode plates 51 connected to the positive energization plate 50 is in the range of 15 to 30, and the number of the negative electrode plates 55 connected to the negative energization plate 56 is in the range of 15 to 30. It is to be noted that the number of the positive electrode plates 51 is equal to the number of the negative electrode plates 55. If the number of the plates 51 or 55 is less than 10, the number of these plates 51 or 55 is small, a sufficient amount of hydrogen or oxygen cannot be generated with the use of these plates 51 and 55 when water is electrolyzed, and a sufficient amount of mixed gas cannot be supplied to the first electrolyzing device 11A. If the number of these plates 51 or 55 exceeds 25, the second housing 18B accommodating these plates 51 and 55 must be increased in size, and the second electrolyzing device 11B cannot be reduced in size.

In the second electrolyzing device 11B, since the number of these positive electrode plates 51 or these negative electrode plates 55 is in the above-described range, sufficient amounts of hydrogen and oxygen can be generated with the use of these plates 51 and 55 without increasing the second housing 11B beyond necessity, and a sufficient amount of mixed gas can be supplied to the first electrolyzing device 11A.

The second supply mechanism 21B is formed of a coupling pipe 70 coupled with the connecting pipe 33 of the lid member 30, a supply pump (not shown) that forcibly supplies a mixed gas generated in the second electrolyzing device 11B to the first electrolyzing device 11A, an electromagnetic valve 71 that turns on/off supply of the mixed gas to the first electrolyzing device 11A, and a filter (not shown) that removes impurities contained in the mixed gas. A supply pipe 70 of the second supply mechanism 21B is coupled with the dome section 31 of the lid member 30 of the first electrolyzing device 11A.

The mixed gas of the hydrogen and the oxygen generated in the first electrolyzing device 11A is supplied to the engine 12, and the mixed gas of the hydrogen and the oxygen that has refilled the first electrolyzing device 11A from the second electrolyzing device 11B is also supplied to the same. The engine 12 drives by combusting the mixed gases supplied from the first electrolyzing device 11A and the second electrolyzing device 113 in each combustion chamber.

An amount of water accommodated in the second space 28B by the water level sensor is measured by the water level sensor. When the amount of the water accommodated in the first space 28A is reduced by electrolysis in the first electrolyzing device 11A and the amount of the water in the first space 28A becomes less than a set value, the feed pump is operated, and the water stored in the second electrolyzing device 11B (the second space 28B of the second housing 18B) is fed to the first electrolyzing device 11A (the first space 28A of the first housing 18A) through the water feed pipe 69.

Figure 1:
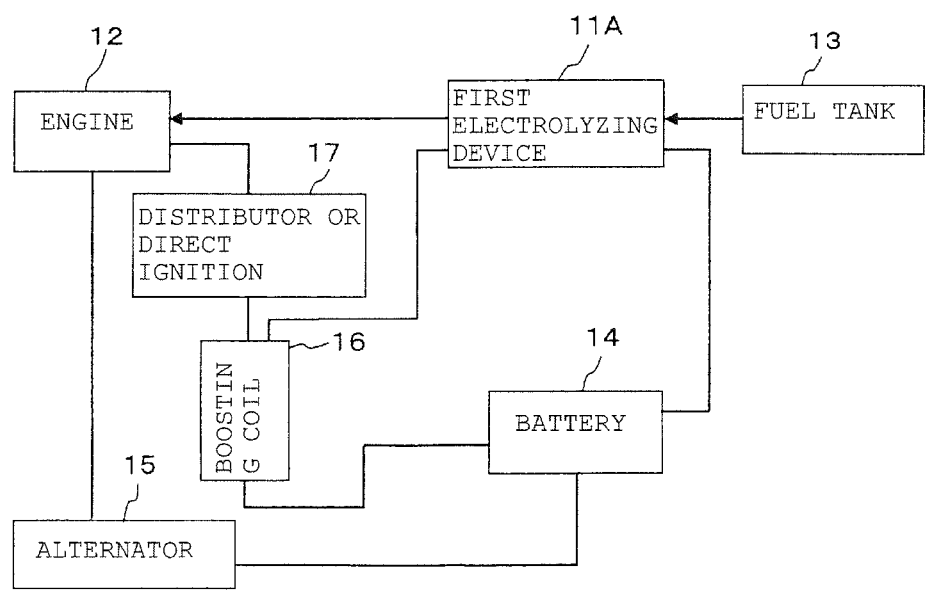
FIG. 1 is a schematic block diagram of an engine system shown as an example.

The battery 14, the alternator 15, and the distributor 17 or the direct ignition 17 are the same as those used in the system 10A in FIG. 1, and hence a description thereof will be omitted. The boosting coil 16 (an ignition coil) energizes the first electrolyzing device 11A and the second electrolyzing device 113 with boosted high-voltage electricity while boosting a voltage of the electricity stored in the battery 14, and also energizes an ignition plug of the engine 12.

An electric cord 62B extending from a negative pole of the battery 14 has a plug electrically connected to a negative pole terminals 56 of the first housing 18A and negative pole terminals 56 of the second housing 18B. An electric cord 62A extending from a positive pole of the battery 14 is electrically connected to an input side of the boosting coil 16. A switch 63 is disposed in the electric cord 62A.

Energization of the first electrolyzing device 11A or the second electrolyzing device 115 with the electricity is turned on/off by turning on/off the switch 63. The electric cord 62A (a high-tension cord) is electrically connected to an output side of the boosting coil 16. The electric cord 62A has a plug electrically connected to the positive pole terminals 52 of the first housing 18A of the positive energization plate 50 and the positive pole terminals 52 of the second housing 18B.

When the switch 63 is in an ON state, the electricity from the battery 14 is boosted to a predetermined high voltage in the boosting coil 16, and the first electrolyzing device 11A and the second electrolyzing device 11B are energized with the high-voltage electricity. In the system 10B, a current value of the electricity that energizes the second electrolyzing device 11B is smaller than that of the electricity that energizes the first electrolyzing device 11A. Specifically, assuming that a current value A1 of the electricity that energizes the first electrolyzing device 11A is 100%, a current value A2 of the electricity that energizes the second electrolyzing device 11B is in the range of 50 to 80% (or preferably 70 to 80%). However, the current value of the electricity that energizes the second electrolyzing device 113 may be equal to the current value of the electricity that energizes the first electrolyzing device 11A.

In the second electrolyzing device 11B, the positive electricity flows from the positive pole terminals 52 to the first positive energization plate 50 and each positive electrode plate 51, the negative electricity flows from the negative pole terminals 56 to the first negative energization plate 54 and each negative electrode plate 55, and the water accommodated in the second space 28B is electrolyzed. It is to be noted that the current value A2 of the electricity that energizes the second electrolyzing device 11B is smaller than the current value A1 of the electricity that energizes the first electrolyzing device 11A, and hence amounts of the hydrogen and the oxygen generated by the positive electrode plates 51 and the negative electrode plates 55 of the second electrolyzing device 11B are smaller than amounts of the hydrogen and the oxygen generated by the positive electrode plates 51 and the negative electrode plates 55 of the first electrolyzing device 11A.

Hydrogen ions and oxygen molecules are generated from each positive electrode plate 51 of the second electrolyzing device 11B, and hydrogen molecules are generated from each negative electrode plate 55. The oxygen molecules or the hydrogen molecules move to the dome section 31 of the lid member 30 from the water. In the dome section 31, the oxygen and the hydrogen are mixed to generate the mixed gas. When the first electrolyzing device 11A needs to be refilled with the mixed gas, the valve mechanism of the electromagnetic valve 71 of the second supply mechanism 21B is opened, the supply pump is operated, and the mixed gas is forcibly supplied to the first electrolyzing device 11A through the coupling pipe 70. When the first electrolyzing device 11A does not need to be refilled with the mixed gas, the valve mechanism of the electromagnetic valve 71 of the second supply mechanism 21B is closed, and energization of the second electrolyzing device 11B with the electricity is stopped.

In the electrolyzing device 11A, the positive electricity flows from the positive pole terminals 52 to the first positive energization plate 50 and each positive electrode plate 51, the negative electricity flows from the negative pole terminals 56 to the first negative energization plate 54 and each negative electrode plate 55, and the water accommodated in the first space 28A is electrolyzed. Hydrogen ions and oxygen molecules are generated from each positive electrode plate 51 of the first electrolyzing device 11A, and hydrogen molecules are generated from each negative electrode plate 55. The oxygen molecules or the hydrogen molecules move to the dome section 31 of the lid member 30 from the water. In the dome section 31, the oxygen and the hydrogen are mixed to generate the mixed gas.

When the valve mechanism of the electromagnetic valve 61 is opened, the mixed gas (when the valve mechanism of the electromagnetic valve is opened, the mixed gas generated in the second electrolyzing device 11B is included) is forcibly supplied to injectors 64 of the engine 12 by the supply pump through the supply pipe 59. The mixed gas supplied to the injectors 64 is injected into intake manifolds 65 from the injectors 64, and flows into combustion chambers 66 of the engine 12 via the intake manifolds 65 (see FIGS. 11 and 12).

In an ignition system, the electricity of the battery 14 is boosted by the boosting coil 16, the high-voltage electricity is allowed to flow to an ignition plug 67 at predetermined timing by the distributer 17 or the direct ignition 17, and a spark is produced from the ignition plug 67. The mixed gas that has flowed into the combustion chambers 66 is ignited by the spark produced from the ignition plug 67, the mixed gas is combusted (exploded) in the combustion chambers 66, pistons of the engine 12 move up and down, and a crank shaft rotates (see FIG. 13). During driving of the engine 12, the alternator 15 generates electricity based on the rotation of the crank shaft, and energizes the battery 14 with the generated electricity.

The mixed gas combusted in the combustion chambers 66 of the engine 12 is converted into water and exhaust oxygen by a chemical reaction. The exhaust oxygen flows into an exhaust manifold 68 of the engine 12 and is then discharged to outside air through a muffler, and a part of the exhaust oxygen flows into the air feed pipes 49 or the air feed pipe 69 from the exhaust manifold 68 and flows into the first space 28A of the first housing 18A and the second space 28B of the second housing 18B through the vent holes 48 in the bottom portion of the sidewall 26 from the air feed pipes 49 and 69.

The exhaust oxygen that has flowed into the first space 28A or the second space 28B turns to fine many air bubbles by an air bubble generation nozzle. These air bubbles are discharged into the water accommodated in the first space 28A, and also discharged into the water stored in the second space 28B. In the first electrolyzing device 11A, the water accommodated in the first housing 18A is stirred by the fine air bubbles discharged into the water, the hydrogen molecules or the oxygen molecules generated by the electrolysis are stirred, and the mixed gas in which the hydrogen molecules and the oxygen molecules are mixed is created in the first housing 18A. Furthermore, in the second electrolyzing device 11B, the water accommodated in the second housing 18B is stirred by the fine air bubbles discharged into the water, the hydrogen molecules or the oxygen molecules generated by the electrolysis are stirred, and the mixed gas in which the hydrogen molecules and the oxygen molecules are mixed is created in the second housing 18B.

In the system 10B, since the hydrogen and the oxygen can be stirred by using the exhaust oxygen, and the mixed gas in which the hydrogen and the oxygen are mixed can be created in the first housing 18A or the second housing 18B. Moreover, besides the hydrogen and the oxygen generated in the first housing 18A, the exhaust oxygen can be used, and a mixed gas containing this exhaust oxygen can be created. Moreover, besides the hydrogen and the oxygen generated in the second housing 18B, the exhaust oxygen can be used, and a mixed gas containing this exhaust oxygen can be created.

In addition to the effects of the engine system 10A, the engine system 10B has the following effects. In the engine system 10B, since the mixed gas of the hydrogen and the oxygen is generated from water in the second electrolyzing device 110B and the generated mixed gas and the water are supplied to the first electrolyzing device 11A, the water corresponding to an amount consumed in the first electrolyzing device 11A can be replenished through the second electrolyzing device 11B, the first electrolyzing device 11A can be replenished with the mixed gas from the second electrolyzing device 11B, and a large amount of mixed gas can be supplied to the engine 12 from the first electrolyzing device 11A. In the engine system 11B, a large amount of the mixed gas is supplied to the engine 12, and a large amount of the mixed gas is combusted in the engine 12, thereby driving the engine 12 with large torque.

Figure 19:
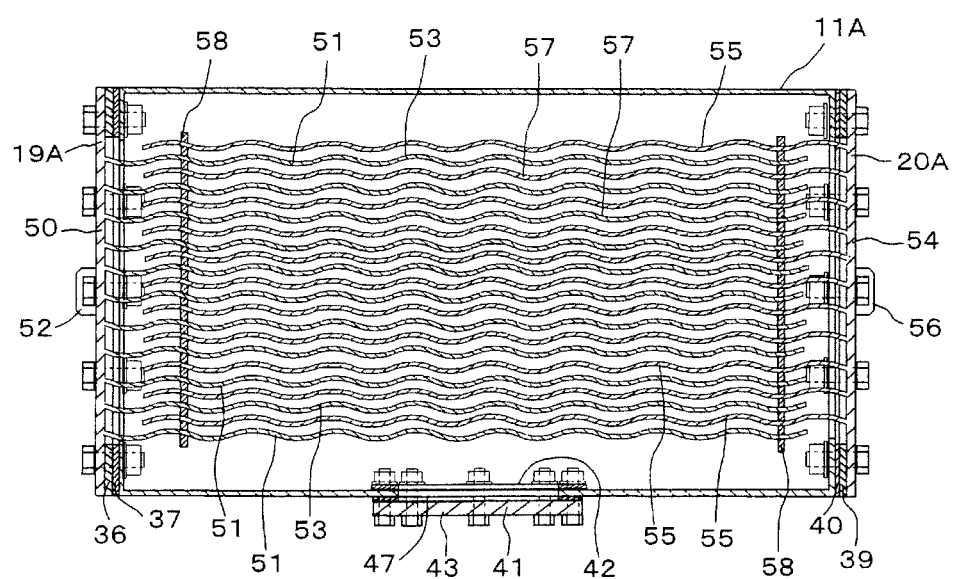
FIG. 19 is an end elevation as another example which is the same as FIG. 5.

FIG. 19 is the same end elevation as FIG. 5, showing another example. Each positive electrode plate 51 shown in FIG. 19 extends from a positive energization plate 50 (a first housing 18A and a front wall 24 of a second housing 18B) toward the first housing 18A and a rear wall 25 of the second housing 183 in a lateral direction in a corrugated manner. Further, each negative electrode plate 55 extends from a negative energization plate 54 (the first housing 18A and the rear wall 25 of the second housing 18B) toward the first housing 18A and the front wall 24 of the second housing 18B in the lateral direction in the corrugated manner.

The positive electrode plates 51 and the negative electrode plates 55 having ups and downs in the corrugated manner are aligned in a state where the positive electrode plates 51 and the negative electrode plates 55 are parallel to each other so that each negative electrode plate 55 is placed between the positive electrode plates 51 adjacent to each other in the lateral direction and each positive electrode plate 51 is placed between the negative electrode plates 55 adjacent to each other in the lateral direction. In these plates 51 and 55, a facing surface 53 of each positive electrode plate 51 and a facing surface 57 of each negative electrode plate 55 face the lateral direction.

An insulator spacer 58 is arranged between the positive electrode plates 51 and the negative electrode plates 55 extending on the front wall 24 side of the first housing 18A. Furthermore, an insulator spacer 58 is arranged between the positive electrode plates 51 and the negative electrode plates 55 extending on the rear wall 25 side of the first housing 18A. The insulator spacers 58 hold a parallel state of the positive electrode plates 51 and the negative electrode plate 55, and also hold a clearance dimension between these plates 51 and 55 in the lateral direction.

The clearance dimension between the positive electrode plate 51 and the negative electrode plate 55 adjacent to each other in the lateral direction is in the range of 5 to 12 mm. A thickness dimension of each of the electrode plates 51 and 55 is in the range of 1 to 2 mm. The number of the electrode plates 51 or 55 is in the range of 10 to 25. A length L1 of an end side of each of the electrode plates 51 and 55 extending in the up-and-down direction to be parallel to the front wall 24 and the rear wall 25 of the first and second housings 18A and 18B and a length L2 of a lateral side of the same extending with ups and downs in the front-and-back direction are the same as those described in conjunction with each of the systems 10A and 10B. Moreover, an area S1 of the facing surface 53 and an area S2 of the facing surface 57 of the respective electrode plates 51 and 55 are the same as those described in conjunction with each of the systems 10A and 10B.

It is to be noted that the length L1 of the end side of each positive electrode plate 51 is equal to the length L3 of the end side of each negative electrode plate 55, and the length L2 of the lateral side of each positive electrode plate 51 is equal to the length L4 of the lateral side of each negative electrode plate 55. Additionally, the area S1 of the facing surface 53 of each positive electrode plate 51 is equal to the area S2 of the facing surface 57 of each negative electrode plate 55.

Figure 20:
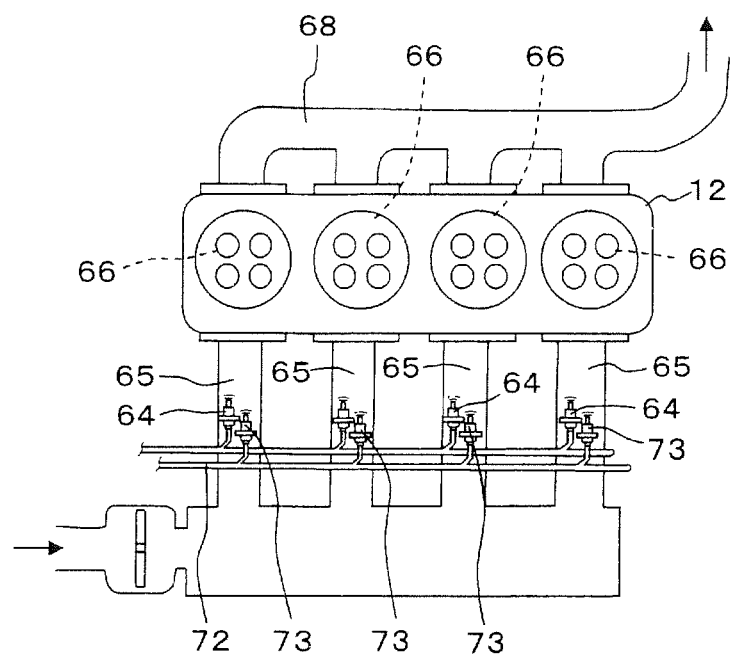
FIG. 20 is a view showing another example of supply of the mixed gas into the engine 12.

FIG. 20 is a view showing another example of supply of the mixed gas to the engine 12. According to a mode shown in FIG. 20, the mixed gas is forcibly supplied to injectors 64 through a supply pipe 59, and a predetermined amount of water is forcibly supplied to injectors 73 through a supply pipe 72. As shown in FIG. 20, the mixed gas supplied to the injectors 64 is injected from the injectors 64 into intake manifolds 65, and the water supplied to the injectors 73 is turned to a mist (nebulized) and injected into the intake manifolds 65 from the injectors 73.

The mixed gas and the mist-like water flow into combustion chambers 66 of the engine 12 through the intake manifolds 65. In the combustion chambers 66, the mixed gas is ignited by a spark coming from an ignition plug 67, the mixed gas is combusted (exploded) in the combustion chambers 66, and the mist-like water is subjected to vapor explosion due to high temperatures achieved by the combustion (the explosion) of the mixed gas, pistons of the engine 12 move up and down, and the crank shaft rotates. According to the mode in FIG. 20, explosion power in the combustion chambers 66 can be increased by subjecting the mist-like water to the vapor explosion, and torque of the engine 12 to be driven can be raised.

EXPLANATION OF LETTERS OR NUMERALS 10A engine system
10B engine system
11A first electrolyzing device
11B second electrolyzing device
12 engine
13 fuel tank
14 battery
15 alternator
16 boosting coil
17 distributor or direct ignition
18A first housing
18B second housing
19A first positive electrode
19B second positive electrode
20A first negative electrode
20B second negative electrode
21A first supply mechanism
21B second supply mechanism
22 top wall
23 bottom wall
24 front wall
25 rear wall
26 sidewall
27 sidewall
28A first space
28B second space
50 positive energization plate
51 positive electrode plate
52 positive pole terminal
53 facing surface (opposed surface)
54 negative energization plate
55 negative electrode plate
56 negative pole terminal
57 facing surface (opposed surface)
58 insulator spacer

The invention claimed is:

1. An engine system comprising: at least one first electrolyzing device that decomposes water into hydrogen and oxygen by electrolysis; an engine that drives by combustion of a mixed gas of the hydrogen and the oxygen generated in the first electrolyzing device; a battery that stores electricity; a boosting coil that energizes the first electrolyzing device and an ignition plug of the engine with boosted high-voltage electricity while boosting a voltage of the electricity stored in the battery; and an alternator that energizes the battery with generated electricity while generating electricity by driving of the engine, wherein the first electrolyzing device comprises: a first housing with a predetermined capacity that accommodates the water; a first positive electrode that is accommodated in the first housing and energized with positive high-voltage electricity from the boosting coil; a first negative electrode that is accommodated in the first housing and energized with negative high-voltage electricity from the boosting coil; and a first supply mechanism that supplies the mixed gas generated in the first housing to the engine, and in the engine system, exhaust oxygen generated after combusting the mixed gas in a combustion chamber of the engine is supplied into the first housing from the lower side of the first housing, and many fine air bubbles are generated in the water accommodated in the first housing by using the exhaust oxygen.

2. The engine system according to claim 1, wherein the first housing is a hexahedron having top and bottom walls, front and rear walls, and both sidewalls, the first positive electrode is formed of a positive energization plate with a predetermined area that is fixed to the front wall of the first housing in an insulating manner and a plurality of positive electrode plates each having a predetermined area that are connected to the positive energization plate and extend from the positive energization plate toward the rear wall of the first housing, the first negative electrode is formed of a negative energization plate with a predetermined area that is fixed to the rear wall of the first housing in an insulating manner and a plurality of negative electrode plates each having a predetermined area that are connected to the negative energization plate and extend toward the front wall of the first housing from the negative energization plate, and the positive electrode plates and the negative electrode plates are alternately arranged to become parallel to each other in the first housing so that each negative electrode plate is placed between the positive electrode plates adjacent to each other and each positive electrode plate is placed between the negative electrode plates adjacent to each other.

3. The engine system according to claim 2, wherein, in the first electrolyzing device, the positive electrode plates extend from the front wall toward the rear wall of the first housing while repeating ups and downs, and the negative electrode plates extend from the rear wall toward the front wall of the first housing while repeating ups and downs.

4. The engine system according to claim 2, wherein, in the first electrolyzing device, an insulator spacer, which holds a parallel state of each positive electrode plate and each negative electrode plate and also holds a clearance dimension between these electrodes, is arranged between each positive electrode plate and each negative electrode plate adjacent to each other.

5. The engine system according to claim 4, wherein, in the first electrolyzing device, the insulator spacer is arranged between each positive electrode and each negative electrode plate extending on the front wall side of the first housing, and the insulator spacer is arranged between each positive electrode plate and each negative electrode plate extending on the rear wall side of the first housing.

6. The engine system according to claim 2, wherein, in the first electrolyzing device, the clearance dimension between the positive electrode plate and the negative electrode plate adjacent to each other is in the range of 5 to 12 mm.

7. The engine system according to claim 2, wherein, in the first electrolyzing device, an area of each of facing surfaces of the positive electrode plates and the negative electrode plates is in the range of 1000 to 2100 cm$^2$, and a thickness dimension of each of the positive electrode plates and the negative electrode plates in the range of 1 to 2 mm.

8. The engine system according to claim 2, wherein, in the first electrolyzing device, each of the number of the positive electrode plates connected to the positive energization plate and the number of the negative electrode plates connected to the negative energization plate is in the range of 10 to 25, and the number of the positive electrode plates is equal to the number of the negative electrode plates.

9. The engine system according to claim 1, wherein, in the engine system, mist-like water is injected simultaneously with supplying the mixed gas into the combustion chamber of the engine, and the mist-like water is subjected to vapor explosion by using combustion of the mixed gas in the combustion chamber.

10. The engine system according to claim 1, wherein the engine system comprises at least one second electrolyzing device that stores the water which is fed to the first electrolyzing device, decomposes the water into hydrogen and oxygen by the electrolysis, and supplies a mixed gas of the generated hydrogen and oxygen and the water to the first electrolyzing device, and the boosting coil energizes the second electrolyzing device with the boosted high-voltage electricity.

11. The engine system according to claim 10, wherein the second electrolyzing device comprises: a second housing with a predetermined capacity that stores the water, a second positive electrode that is accommodated in the second housing and energized with positive high-voltage electricity from the boosting coil, a second negative electrode that is accommodated in the second housing and energized with negative high-voltage electricity from the boosting coil, and a second supply mechanism that supplies the mixed gas generated in the second housing and the water to the first electrolyzing device.

12. The engine system according to claim 11, wherein the second housing is a hexahedron having top and bottom walls, front and rear walls, and both sidewalls, the second positive electrode is formed of a positive energization plate with a predetermined area fixed to the front wall of the second housing in an insulating manner and a plurality of positive electrode plates each having a predetermined area that are connected to the positive energization plate and extend from the positive energization plate toward the rear wall of the second housing, the second negative electrode is formed of a negative energization plate with a predetermined area fixed to the rear wall of the second housing in an insulating manner and a plurality of negative electrode plates each having a predetermined area that are connected to the negative energization plate and extend from the negative energization plate toward the front wall of the second housing, and the positive electrode plates and the negative electrode plates are alternately aligned in a state where the positive electrodes and the negative electrode plates are parallel to each other so that the negative electrode plate is placed between the positive electrode plates adjacent to each other and the positive electrode plate is placed between the negative electrode plates adjacent to each other in the second housing.

13. The engine system according to claim 12, wherein, in second electrolyzing device, the positive electrode plates extend from the front wall toward the rear wall of the second housing while repeating ups and downs and the negative electrode plates extend from the rear wall toward the front wall of the second housing while repeating ups and downs.

14. The engine system according to claim 12, wherein, in the second electrolyzing device, an insulator pacer, which holds a parallel state of the positive electrode plates and the negative electrode plates and also holds a clearance dimension between these plates constant, is placed between the positive electrode plates and the negative electrode plates adjacent to each other.

15. The engine system according to claim 14, wherein, in the second electrolyzing device, the insulator spacer is arranged between the positive electrode plates and the negative electrode plates extending on the front wall side of the second housing, and the insulator spacer is arranged between the positive electrode plates and the negative electrode plates extending on the rear wall side of the second housing.

16. The engine system according to claim 12, wherein, in the second electrolyzing device, the clearance dimension between the positive electrode plate and the negative electrode plate adjacent to each other is in the range of 5 to 12 mm.

17. The engine system according to claim 12, wherein, in the second electrolyzing device, an area of each of facing surfaces of the positive electrode plates and the negative electrode plates is in the range of 1500 to 2550 cm$^2$, and a thickness dimension of each of the positive electrode plates and the negative electrode plates is in the range of 1 to 2 mm.

18. The engine system according to claim 12, wherein, in the second electrolyzing device, each of the number of the positive electrode plates connected to the positive energization plate and the number of negative electrode plates connected to the negative energization plate is in the range of 15 to 30, and the number of the positive electrode plates is equal to the number of the negative electrode plates.

19. The engine system according to claim 12, wherein, in the engines system, exhaust oxygen generated after combusting the mixed gas in the combustion chamber of the engine is supplied into the second housing from the lower side of the second housing, and many fine air bubbles are generated in the water accommodated in the second housing by using the exhaust oxygen.

20. The engine system according to claim 1, wherein the engine system is mounted in a vehicle.

* * * * *